United States Patent [19]

Nakamura et al.

[11] Patent Number: 4,650,926

[45] Date of Patent: Mar. 17, 1987

[54] ELECTROGRAPHIC SYSTEM AND METHOD

[75] Inventors: Shoichiro Nakamura, Columbus; Robert G. Kable, Dublin, both of Ohio

[73] Assignee: Scriptel Corporation, Columbus, Ohio

[21] Appl. No.: 742,733

[22] Filed: Jun. 7, 1985

Related U.S. Application Data

[63] Continuation-in-part of Ser. No. 664,980, Oct. 26, 1984, abandoned.

[51] Int. Cl.[4] .......................................... G08C 21/00
[52] U.S. Cl. ...................................... 178/18; 340/709
[58] Field of Search ............................ 178/18, 19, 20; 340/709, 707, 711; 364/515, 561, 520, 571

[56] References Cited

U.S. PATENT DOCUMENTS

| 2,925,467 | 2/1960 | Becker | 178/18 |
|---|---|---|---|
| 3,005,050 | 10/1961 | Koenig | 178/20 |
| 3,449,516 | 6/1969 | Cameron et al. | 178/18 |
| 3,466,391 | 9/1969 | Ellis | 178/18 |
| 3,497,617 | 2/1970 | Ellis | 178/18 |
| 3,522,664 | 8/1970 | Lambright et al. | 35/8 |
| 3,530,241 | 9/1970 | Ellis | 178/19 |
| 3,576,356 | 4/1971 | Hyman et al. | 350/156 |
| 3,582,962 | 6/1971 | Mazza | 178/19 |
| 3,588,345 | 6/1971 | Dym | 178/18 |
| 3,590,158 | 6/1971 | Pabst | 178/18 |
| 3,624,293 | 11/1971 | Baxter | 178/18 |
| 3,632,874 | 1/1972 | Malavard et al. | 178/18 |
| 3,648,277 | 3/1972 | Whetstone et al. | 340/347 AD |
| 3,670,103 | 6/1972 | Baxter et al. | 178/19 |
| 3,691,718 | 7/1971 | Asano et al. | 178/18 |
| 3,699,439 | 10/1972 | Turner | 324/71 R |
| 3,757,322 | 9/1973 | Barkan et al. | 340/365 C |
| 3,857,022 | 12/1974 | Rebane et al. | 235/151 |
| 3,885,097 | 5/1975 | Pobgee | 178/18 |
| 3,911,215 | 10/1975 | Hurst | 178/18 |
| 3,921,165 | 11/1975 | Dym | 340/347 NI |
| 3,958,234 | 5/1976 | Hoo | 340/324 M |
| 3,959,585 | 5/1976 | Mattes et al. | 178/18 |
| 3,992,579 | 11/1976 | Dym et al. | 178/18 |
| 4,018,989 | 4/1977 | Snyder et al. | 178/18 |
| 4,031,603 | 3/1978 | Davis et al. | 178/19 |
| 4,055,726 | 10/1977 | Turner et al. | 178/18 |
| 4,071,689 | 1/1978 | Talmage et al. | 178/18 |
| 4,079,194 | 3/1978 | Kley | 178/18 |
| 4,087,625 | 5/1978 | Dym et al. | 178/19 |
| 4,181,952 | 1/1980 | Casey et al. | 178/19 |
| 4,198,539 | 4/1980 | Pepper | 178/18 |
| 4,214,122 | 7/1980 | Kley | 178/18 |
| 4,302,011 | 11/1981 | Pepper | 273/85 G |
| 4,346,260 | 8/1982 | Kaufman | 178/18 |
| 4,456,787 | 6/1984 | Schlosser et al. | 178/19 |
| 4,477,877 | 10/1984 | Nakamura et al. | 178/18 |

OTHER PUBLICATIONS

Fast Computer Graphic Data Entry; J. A. Turner & G. J. Ritchie; IEE Conference Publication No. 150, pp. 24–27.

Linear Current Division in Resistive Areas; J. A. Turner & G. J. Ritchie, Spring Joint Computer Conference, 1970; pp. 613–620.

Primary Examiner—Stafford D. Schreyer
Attorney, Agent, or Firm—Mueller and Smith

[57] ABSTRACT

An electrographic system and method having a control which carries out correction for graphic surface non-linearities. The control employs a procedure wherein a correction look-up table is developed as part of the manufacture of the device wherein output readings are taken along a physical domain rectangular grid array of predetermined dimension and these output readings are adjusted in their signal domain to establish a regularly incremented sequence of address values within that signal domain. Physical domain coordinate values then are derived and placed in the table for each address value. The control then accesses this memory for each of a given locator or tracer position on the graphic surface and carries out an interpolative weighting to derive acceptably accurate coordinate pair signals which are outputted to a host computer or the like.

30 Claims, 40 Drawing Figures

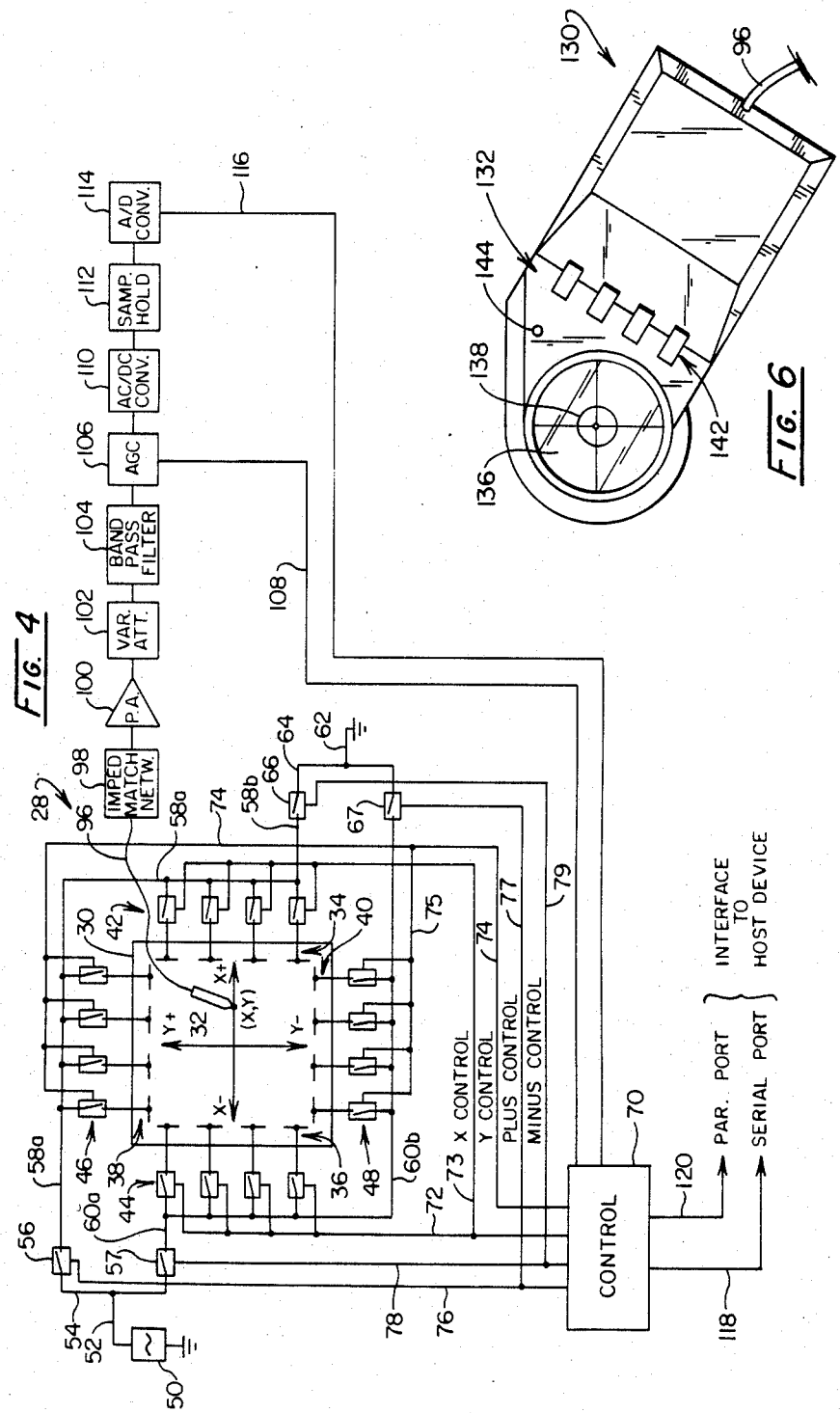

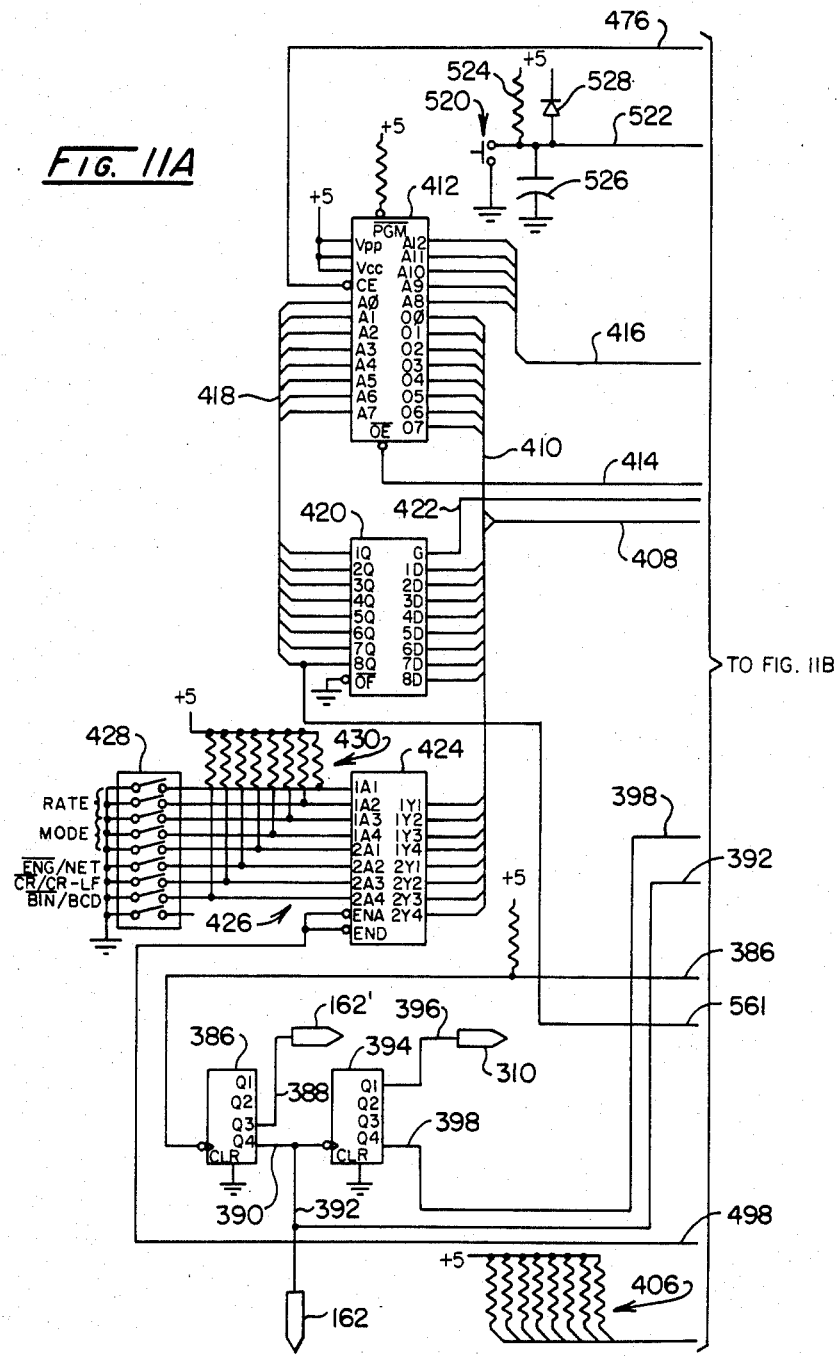

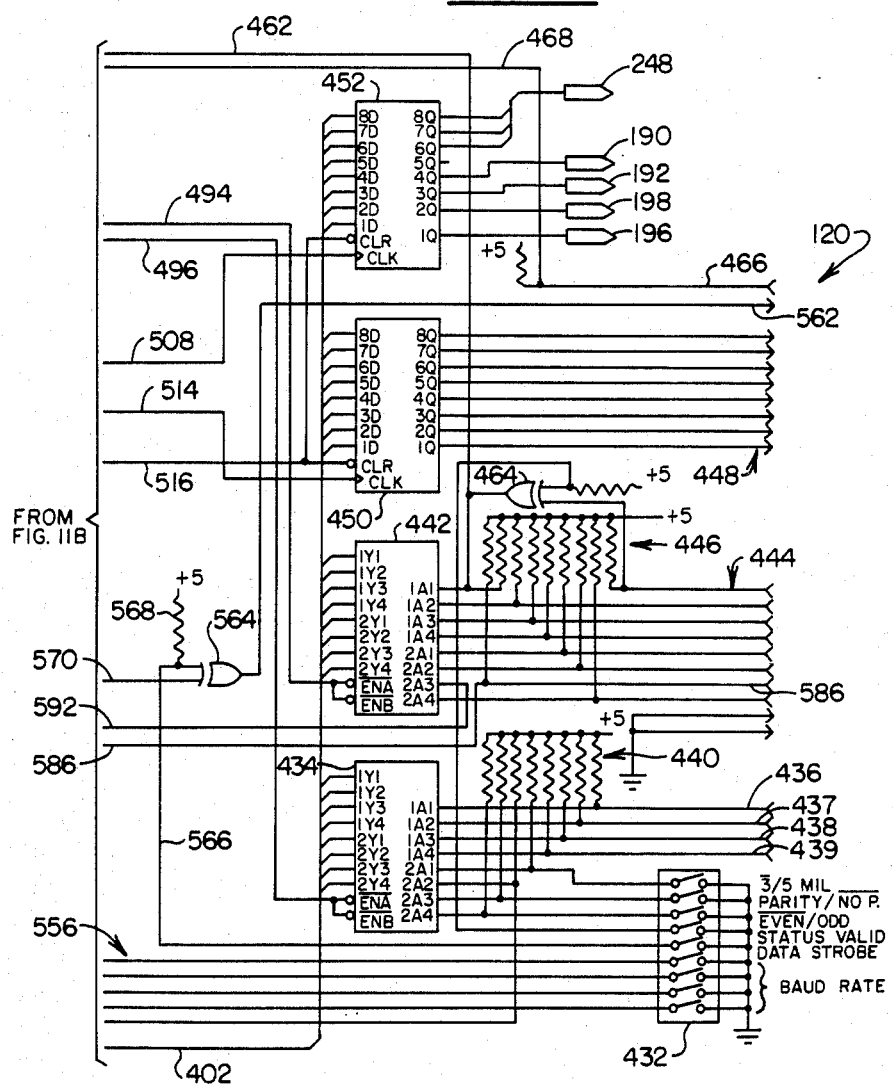

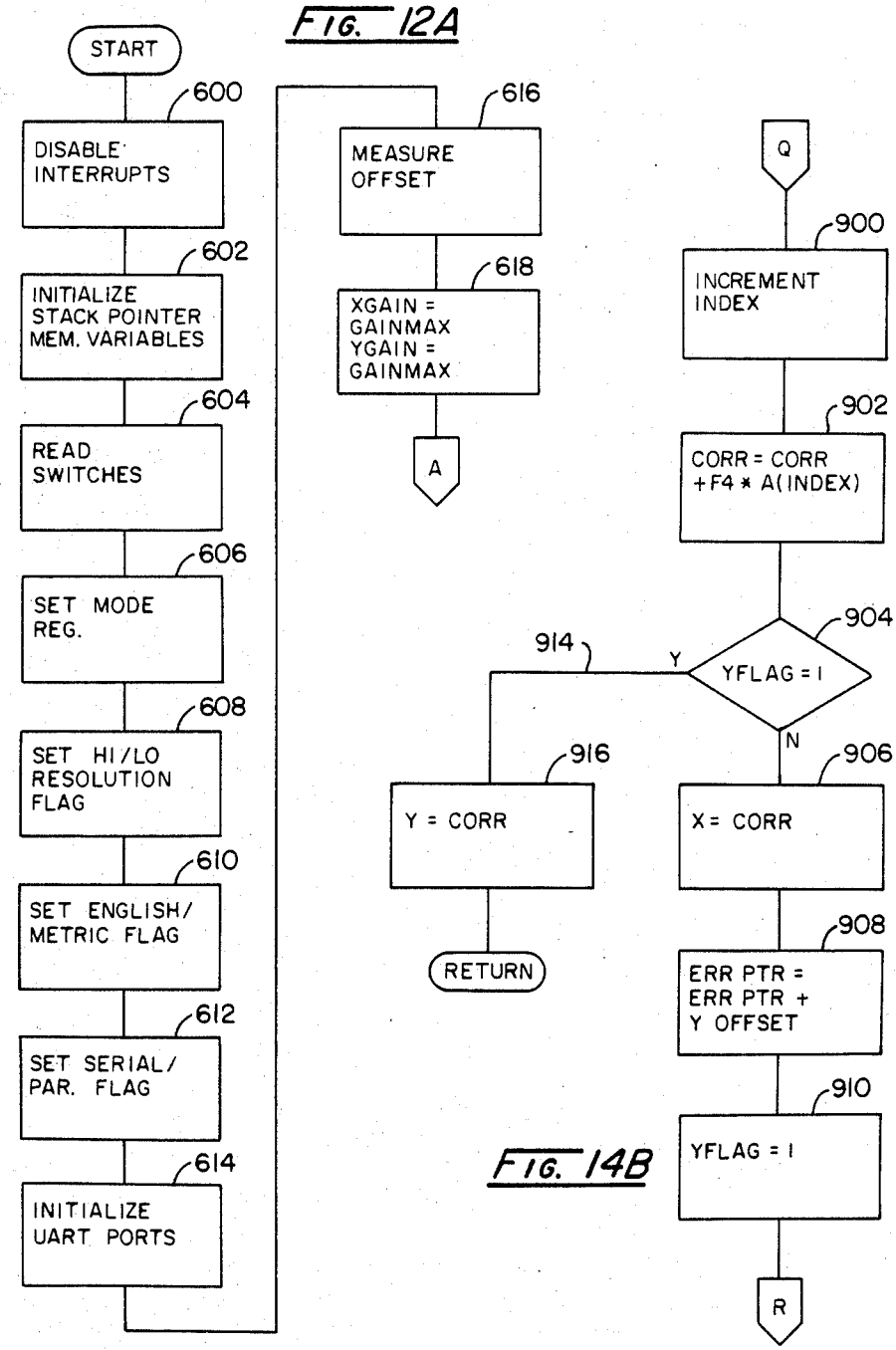

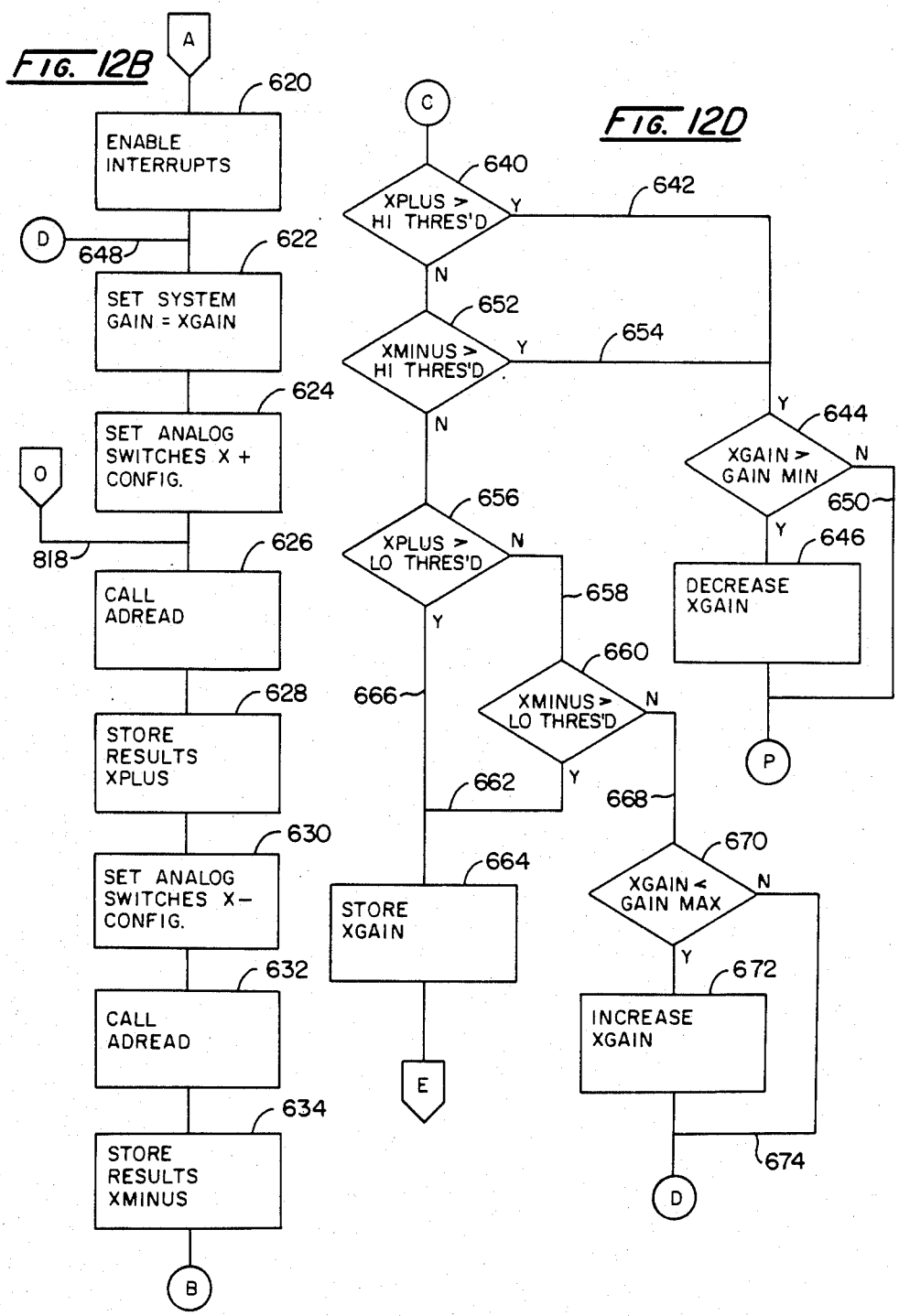

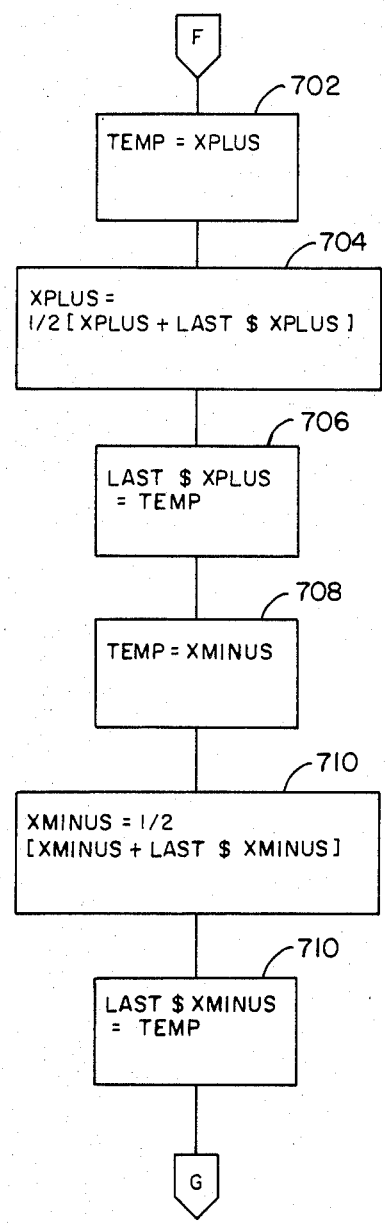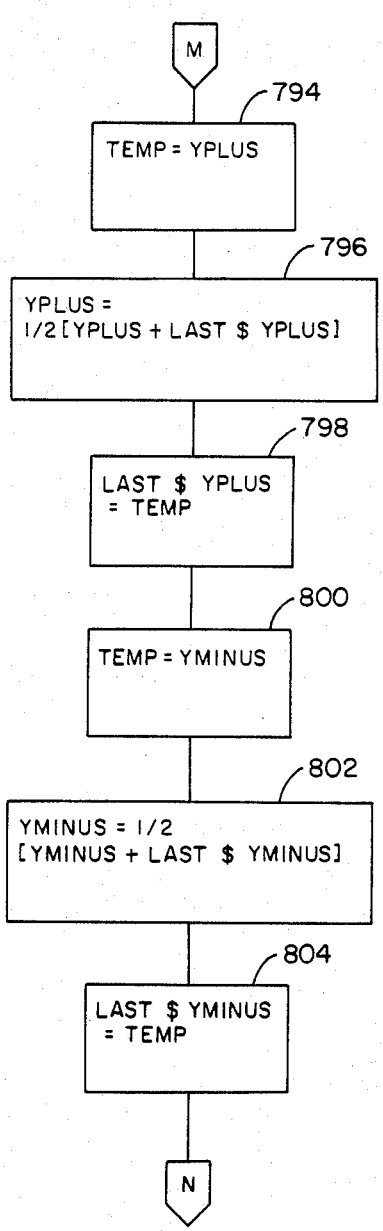

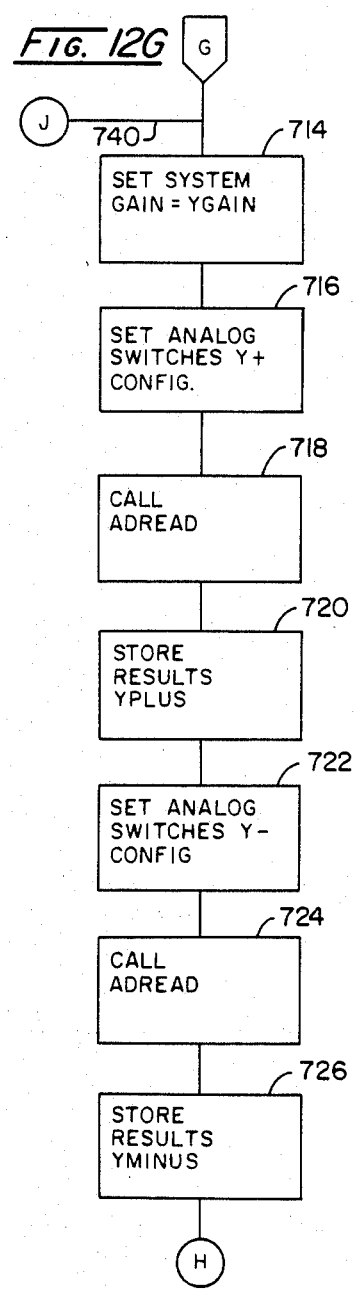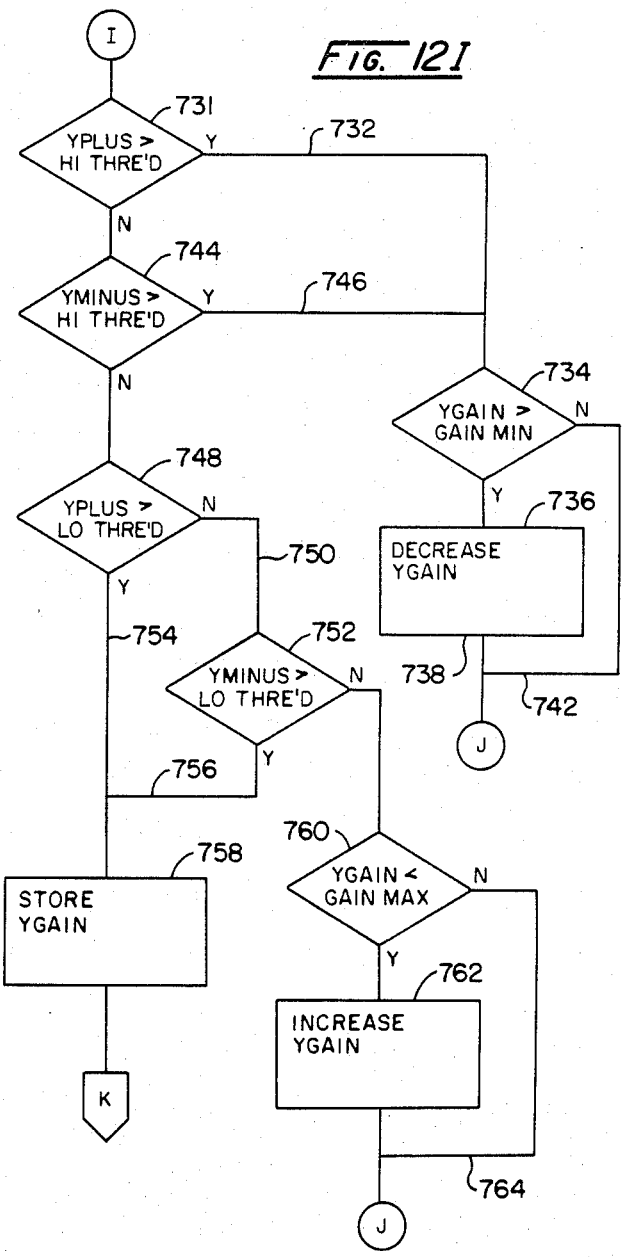

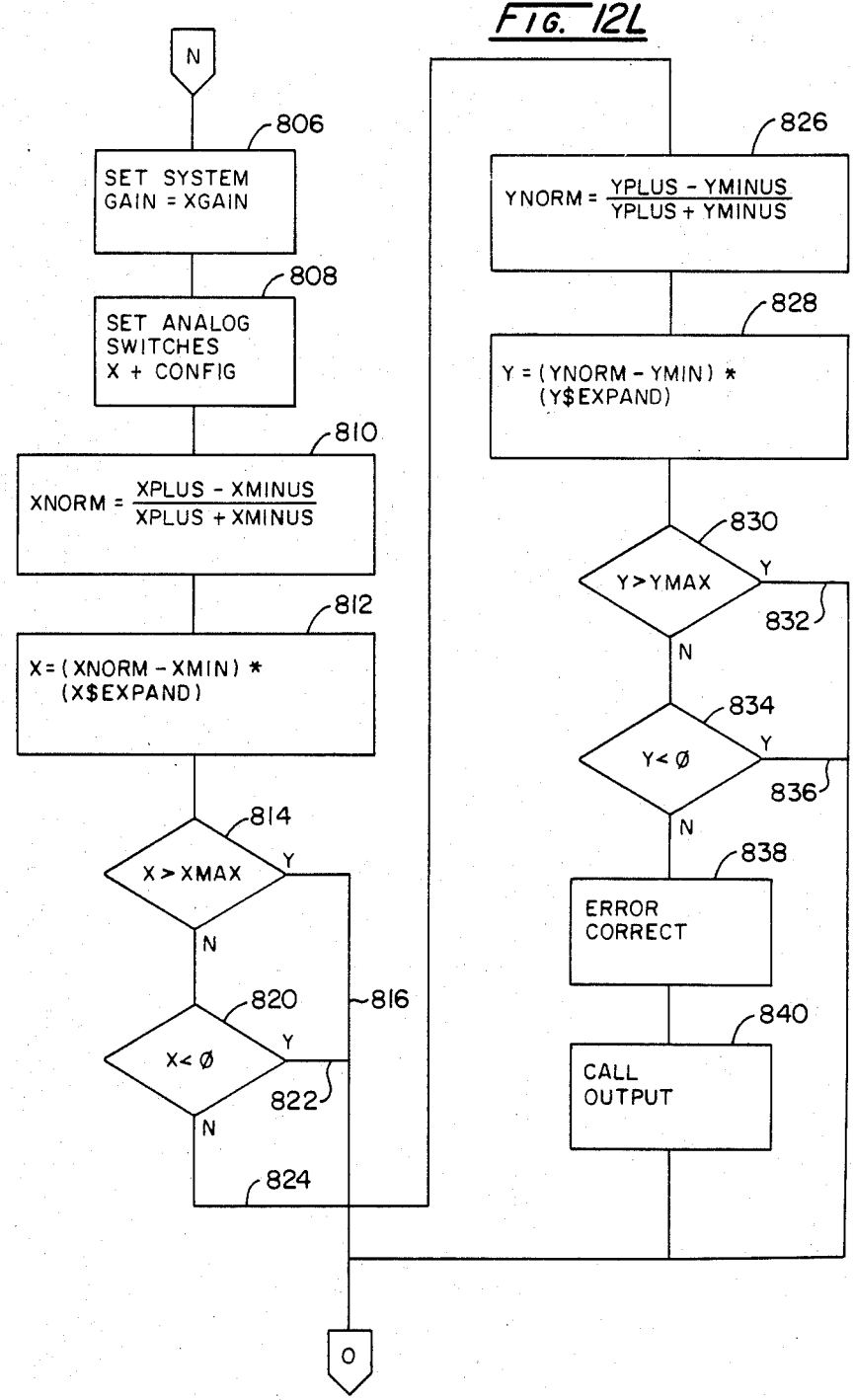

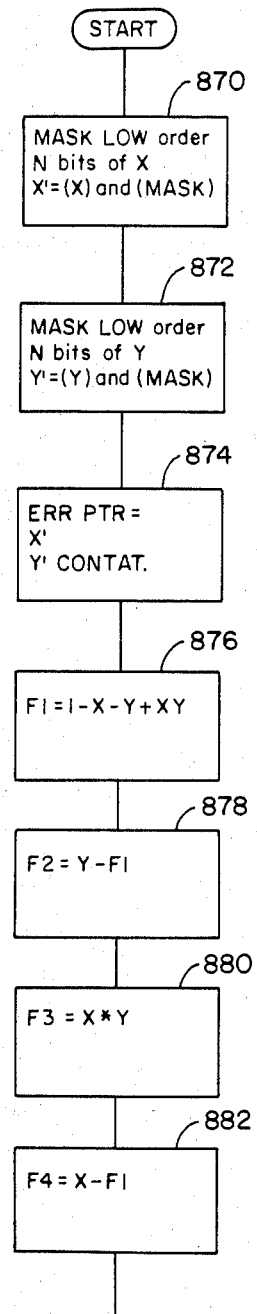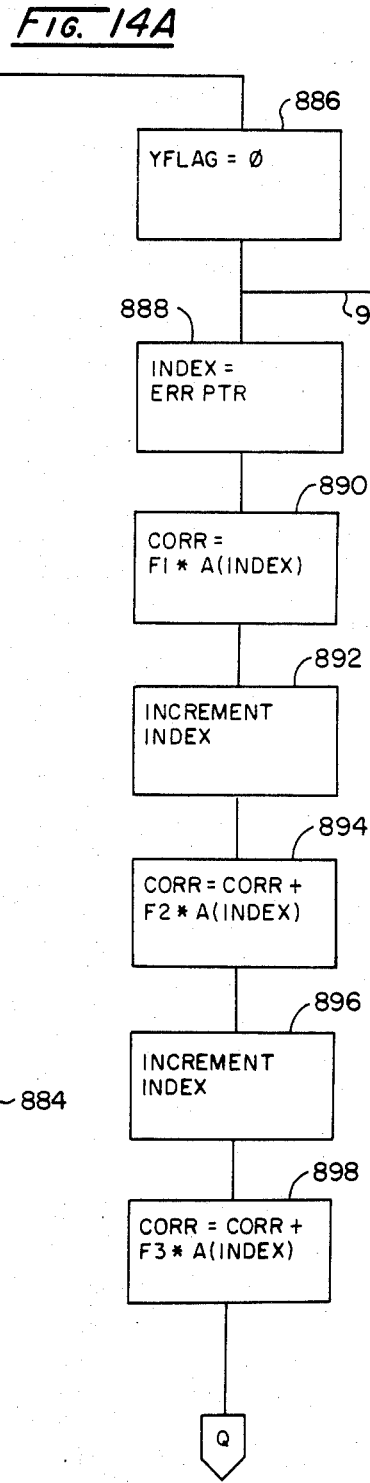
FIG. 14A

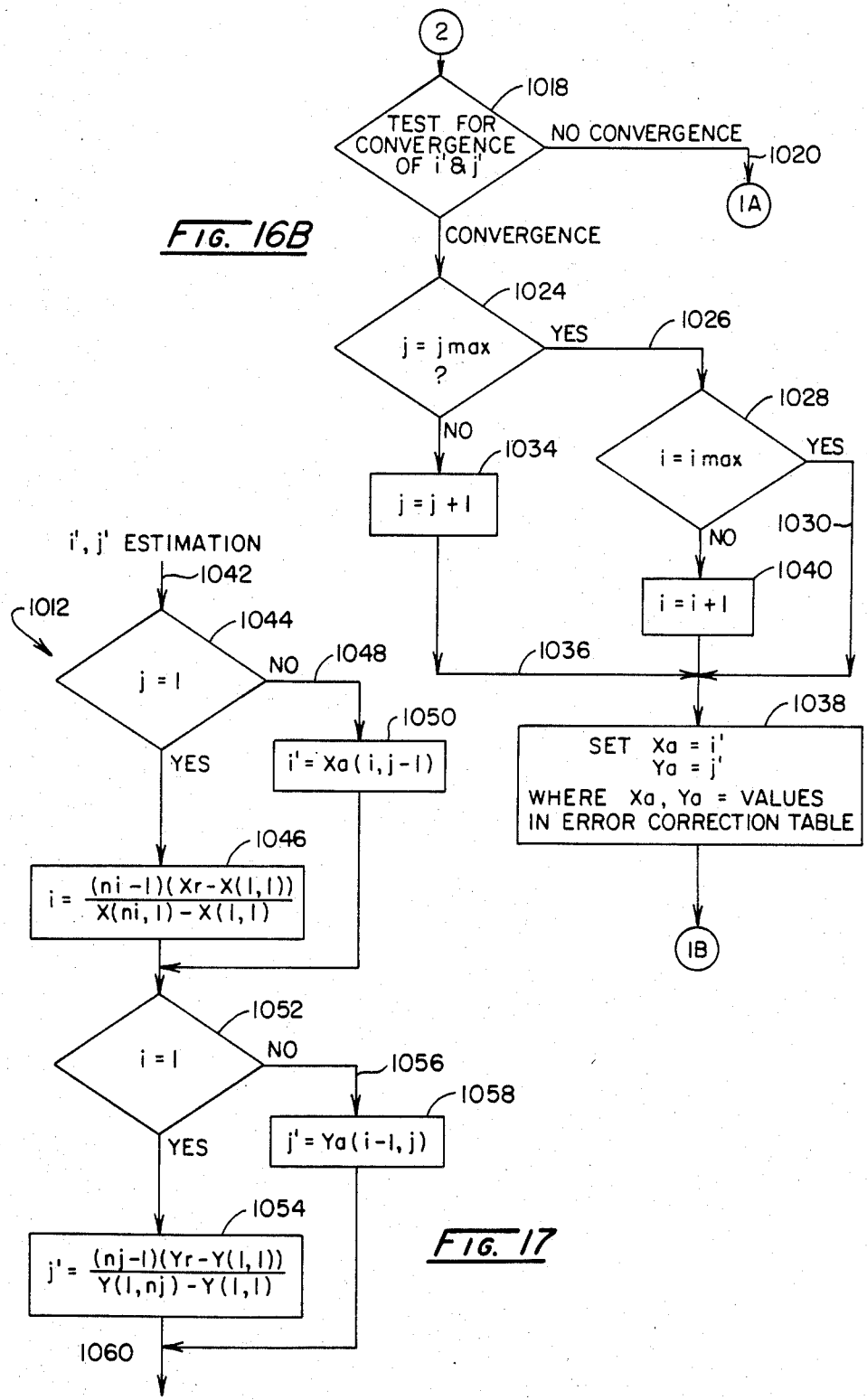

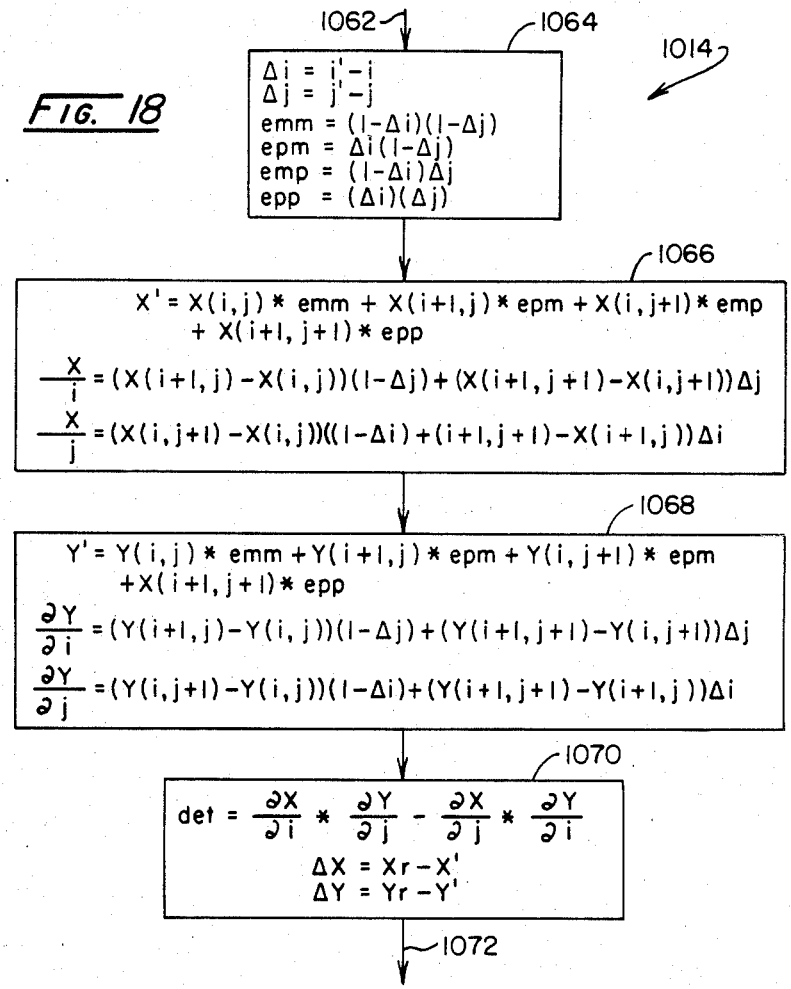
FIG. 18
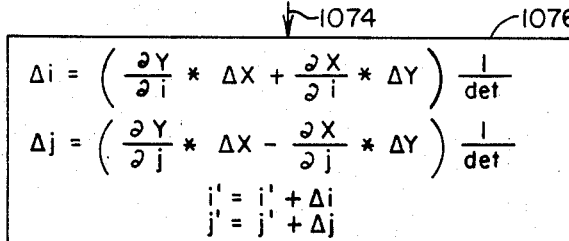
FIG. 19
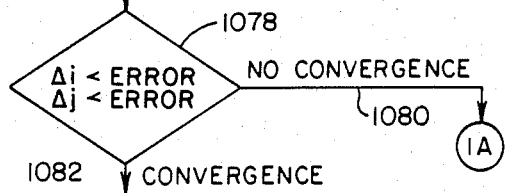

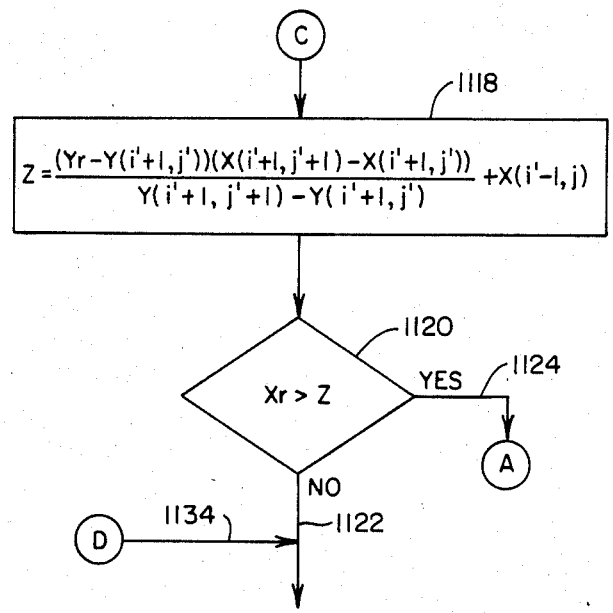
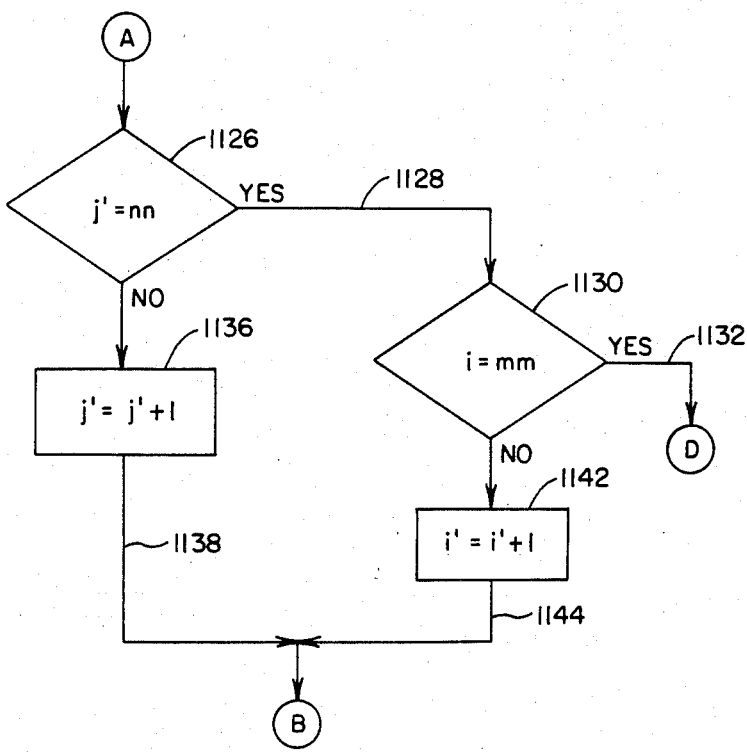
FIG. 20B

ELECTROGRAPHIC SYSTEM AND METHOD

RELATED APPLICATION

The present application is a continuation-in-part of application for U.S. patent Ser. No. 664,980, filed Oct. 26, 1984, abandoned by Nakamura et al. and assigned in common herewith.

BACKGROUND OF THE INVENTION

Investigators have developed a variety of technical approaches to the generation of coordinate pair signals from electrographic devices. Industrial requirements for these devices are increasing concomitantly with the evolution of computer graphics, computer aided design and computer aided manufacturing systems. For such utilization, however, the digitizers or graphic tablets constituting such electrographic devices are called upon to perform in an electrically noisy environment. These environments have been observed to generate interfering frequencies, for example, from the synchronizing signals and the like of the visual readout components and of related electronics which necessarily are located in the region of operation of the tablets.

The operation of a digitizer or graphics tablet generally involves the same manual procedures as are employed in conventional graphics design, a stylus or tracer representing a writing instrument being drawn across or selectively positioned upon the digitizer surface. In turn, the electrographic device responds to the position of the stylus to generate analog paired coordinate signals which are digitized and conveyed to a host computer facility.

For the most part, digitizers have been fashioned as composite structures wherein a grid formed of two spaced arrays of mutually orthogonally disposed fine wires is embedded in an insulative carrier. One surface of this structure serves to yieldably receive a stylus input which is converted to coordinate signals. Various methods have been devised for generating coordinate defining signals, as a stylus-grid interaction, for example, a magnetostrictive effect may be established between stylus and grid or a capacitive coupling effect may be evoked between these components.

The use of such grid structures, while providing accurate, linear output coordinate signals, necessarily involves intricate structures which are expensive to fabricate and are prone to damage in the normal course of use. Further, for many applications, it is desirable that the digitizer be fabricated as a highly transparent composite sheet. However, grid formations within the composite structures generally preclude such a transparency feature.

Early investigators have observed the advantage of developing digitizers having writing surfaces formed of a continuous resistive material coating. An immediately recognized advantage for this approach to digitizer design resides in the inherent simplicity of merely providing a resistive surface upon a supportive insulative subtrate such as glass or plastic. Further, the substrates and associated resistive coatings may be transparent to permit an expanded range of industrial applications.

The history of development of such resistive coating type devices shows that investigators have encountered a variety of technical problems, one of which being the non-uniform nature of the coordinate readouts achieved with the surfaces. Generally, precise one-to-one correspondence or linearity is required between the actual stylus or tracer position and the resultant coordinate signals. Because the resistive coatings cannot be practically developed without local resistance variations, for example of about +10%, the non-linear aspects of the otherwise promising design approach have impeded the development of practical devices until recently. However, certain important technical approaches to uitilizing the resistive surfaces have been achieved. For example, Turner discloses a border treatment or switching technique in U.S. Pat. No. 3,699,439 entitled "Electrical Probe-Position Responsive Apparatus and Method" issued Oct. 17, 1972, assigned in common herewith. This approach utilizes a direct current form of input to the resistive surface from a hand-held stylus, the tip of which is physically applied to the resistive surface. Schlosser et al. describe still another improvement wherein an a.c. input signal is utilized in conjunction with the devices and signal treatment of the resulting coordinate pair output signal is considerably improved. See U.S. Pat. No. 4,456,787 entitled "Electrographic System and Method", issued June 26, 1984, also assigned in common herewith. Position responsive performance of the resistive layer devices further has been improved by a voltage waveform zero crossing approach and an arrangement wherein a.c. signals are applied to the resistive layer itself to be detected by a stylus or tracer as described in U.S. Pat. No. 4,055,726 by Turner et al. entitled "Electrical Position Resolving by Zero-Crossing Delay" issued Oct. 25, 1977, and also assigned in common herewith.

As the designs of resistive layer surface digitizers now reach a level of technical development permitting their practical implementation, further need has been exhibited for their additional refinement with respect to improvements in linearity, i.e. with respect to the accuracy of their performance. While such refinements may be contemplated utilizing computer programming or software approaches, computational techniques generally have been observed to require software architecture evidencing such complexity as to render digital treatment too slow and to require overly expensive microprocessor devices.

SUMMARY

The present invention is addressed to an electrographic system and method wherein a control feature is provided which carries out correction for graphic surface non-linearities employing a procedure which is advantageously rapid and additionally may be executed using practically priced processing components. With the system, as a preliminary portion of correction, readouts are taken in the physical domain along each of the resistive surfaces or graphic surfaces in accordance with a predetermined geometry. The signals then are adjusted in terms of their signal domain to derive memory addresses as a regularly incremented sequence of address values for graphic readouts which correspond with computed physical domain coordinate values. In the operation of the system, this memory is accessed by developing the address values from given or real time readouts and an interpolative correction procedure is carried out using the computed physical domain coordinate values as weighted by real readout values. In particular, the interpolation scheme used is one of parabolic blending which is one approach to two-dimensional interpolation.

Another feature of the invention is to provide an electrographic system which includes an arrangement defining a graphics surface and a locator which is movable in adjacency about that surface for select interaction therewith to effect the derivation of position signals. A treatment circuit responds to those position signals for deriving digital position signals. A memory is provided for retaining computed physical domain coordinate values derived at values corresponding with select digital position signals of a signal domain and established for each position within a predetermined grid array of pre-established positions of that physical domain, adjusted to establish a regularly incremented sequence of address values within the signal domain. A control is provided which is responsive to each given of the digital position signal received thereby for deriving an address value corresponding therewith. The control accesses the memory at the address value to retrieve computed physical domain coordinate values corresponding therewith and adjust the values of the aforesaid computed physical domain coordinate value by two-dimensional interpolative weighting in correspondence with the received digital position signal to derive corrected coordinate pair output signals.

Another feature of the invention is to provide, in an electrographic system wherein a surface is selectively accessed to develop electrical signals which are treated to provide outputs corresponding with the accessed position, the method of correcting the value of given ones of those outputs, comprising:

providing a memory for retaining computed physical domain coordinate values derived as values corresponding with select outputs of a signal domain and establishing for each position within a predetermined grid array of pre-established positions of this physical domain, adjusted to establish a regularly incremented sequence of address values within the signal domain;

deriving an address value from the given output;

accessing said memory at the address value to provide a computed physical domain coordinate value corresponding therewith;

adjusting the value of the accessed computed physical domain coordinate value by a two-dimensional interpolative weighting thereof in correspondence with the given output to derive a corrected given output; and outputting the corrected given output to provide coordinate information representing the accessed position at the surface.

Another feature of the invention is to provide, in an electrographic system wherein a graphic surface of known geometric configuration is selectively accessed by a locator to develop electrical signals which are treated to provide outputs corresponding with the physical location of the locator, the method of correcting the value of given ones of the output with respect to variations of the surface which comprises the steps of:

determining, within a physical domain, a grid array of physically locatable positions over the surface;

deriving, within a signal domain, the electrical signals and corresponding outputs with respect to each array position of the physical domain;

deriving, within the signal domain, a regularly incremented sequence of address values;

determining physical domain coordinate values corresponding with each of the aforesaid address values;

recording the physical domain coordinate values in conjunction with corresponding address values;

deriving a correction address value from the noted given output;

accessing the memory at the correction address value for the physical domain coordinate values corresponding therewith;

adjusting the value of the physical domain coordinate value by two-dimensional interpolative weighting thereof in correspondence with the given output to derive a corrected given output; and outputting the corrected given output to provide coordinate pair information representing the locator physical position.

Still another feature of the invention is to provide a method for generating a memory retained look-up table for use in interpolatively correcting the position outputs in a signal domain corresponding to access locations within the physical domain of a resistive surface includes the steps of:

collecting an input data set from the surface representing physical and signal domain characteristics of that surface;

determining the bounds of the input data set as maximum and minimum signal domain values for first and second coordinate directions;

deriving first and second sets of regularly incremented address locatable values extending between the maximum and minimum signal domain values corresponding, respectively, with the first and second coordinate directions;

providing a first estimate of the physical domain coordinate location values on the surface corresponding with the address locatable values for each of the first and second coordinate directions;

deriving from the first estimate and adjacent values of the input data set interpolated physical domain coordinate location values for each of the first and second coordinate directions; and positioning the interpolated physical domain coordinate location values in memory in combination with corresponding signal domain address locatable values.

The invention, accordingly, comprises the apparatus, system and method possessing the construction, combination of elements, steps, and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 4 is a schematic representation showing the circuit and switching components of the instant invention;

FIG. 6 is a top view of a tracer or locator used with the invention;

FIGS. 11A-11C are electrical schematic diagrams of the digital treatment components of the system of the invention;

FIGS. 12A-12L constitute a flow chart describing the main control program of the system of the invention;

FIGS. 14A-14B constitute a flow chart describing the ERROR CORRECT subroutine of the control program of the invention;

FIGS. 16A and 16B represent a general or high level flow chart describing the method for generating a correction table according to the invention;

FIG. 17 is a flow chart for one estimation routine of the flow chart of FIGS. 16A and 16B;

FIG. 18 is a flow chart of a routine for carrying out Newton interpolation as shown in general in the flow chart of FIGS. 16A and 16B; and FIG. 19 is a flow chart of a routine for carrying out re-estimation procedures shown in general in the flow chart of FIGS. 16A and 16B.

FIGS. 20A-20B combine to provide a flow chart representing an alternate routine for carrying out the estimation procedures described generally in conjunction with FIGS. 16A and 16B.

DETAILED DESCRIPTION

In the discourse to follow, an electrographic device representing a first embodiment of the invention is described wherein the resistive surface of the digitizer or tablet is excited by an a.c. source, as opposed to the application of such source through a stylus or tracer. However, it should be understood that, with the exception of the selection of excitation frequencies, the same structure and circuitry as is described herein may be utilized with the latter geometry. The noted embodiment wherein the resistive surface itself is excited from an a.c. source provides for an enhanced capability for improved signal-to-noise ratio performance. Where such ratios are improved, otherwise deleterious noise effects can be avoided and more desirable excitation frequencies can be selected for operation of the system.

Figure 1:
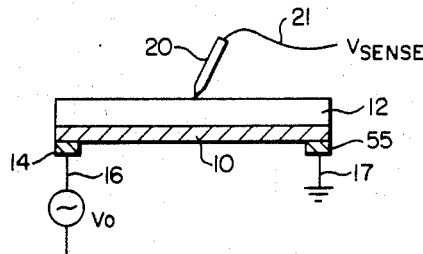
FIG. 1 is a schematic representation of a one-dimensional model of the electrographic apparatus of the invention.
Figure 2:
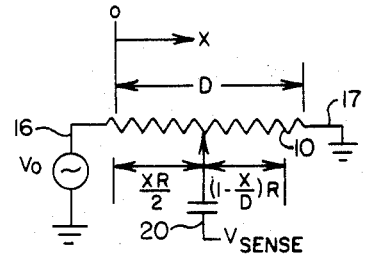
FIG. 2 is a schematic equivalent circuit of the model of FIG. 1.
Figure 3:
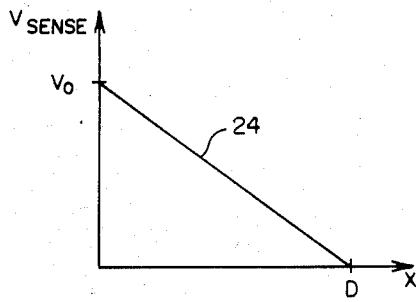
FIG. 3 is a schematic, idealized curve showing voltage distribution across the resistive layer represented in FIG. 1.

As a preliminary consideration of the instant system and method, reference is made to FIGS. 1-3 wherein an idealized one-dimensional model of the digitizing technique of a first embodiment is revealed. In FIG. 1, a graphics surface such as a resistive sheet, for example, formed of indium-tin-oxide, is represented at 10 over which there is located a dielectric material represented at 12. Electrodes are shown coupled to the resistive sheet 10 at 14 and 15. Electrode 14 is coupled with an a.c. source designated Vo from line 16, while electrode 15 is coupled to ground through line 17. A locator, such as a stylus or tracer 20 is positioned adjacent to the resistive layer 10 at any given location and through capacitive coupling serves to pick-up a voltage output at a line 21, such voltage being labelled "Vsense". The equivalent circuit for this idealized one-dimensional model is represented in FIG. 2 where the resistive layer 10 is shown as a resistor and the distance of the stylus 20 from the edge of the resistor closest to the source Vo is represented as "X" and the distance between electrodes 14 and 15 is represented as "D". The fraction of resistance of layer 10 extant from the source of voltage excitation to the location, X, may be represented as $$XR/D,$$

while the distance from the location of the stylus 20 to the opposite electrode 15 may be represented as the labelled $$(1=(X/D))R$$

The corresponding idealized value for Vsense is shown in FIG. 3 as being linear, as represented at the curve 24.

A corresponding one-dimensional model for the above-noted embodiment of the invention wherein the excitation from the voltage source occurs through the stylus is described in detail in the noted U.S. Pat. No. 4,456,787.

To derive signals representing coordinate pairs with respect to the position of stylus or tracer 20 on the resistive surface 10, measurements of the voltage Vsense are made along orthogonally disposed axes designated x and y. Through the utilization of switching, the application of the voltage source as through line 16 and the connection of ground as through line 17 as shown in FIG. 1 are alternately reversed for each of the x y coordinates. With the values thus obtained for each designated x and y coordinate, a difference/sum voltage ratio is determined to obtain a coordinate position signal.

Referring to FIG. 4, a digitizer apparatus is shown generally in schematic fashion at 28. Apparatus 28 incorporates a switching technique for carrying out a difference/sum ratio coordinate position. In the figure, a resistive sheet is shown at 30 having a rectangular shape and being accessed by a locator present as a stylus or tracer 32 at some point (x, y). The resistive sheet 30 is shown having designated x+ and x− axes as well as y+ and y− axes the intersection therebetween being essentially at the center of the rectangularly configured sheet 30.

Assuming that the coordinate system shown ranges from +1 to −1 in both the x and y directions, a signal representing any given coordinate (x, y) pair can be determined by measuring the voltage value picked up by stylus or tracer 32 under a procedure where the alternating voltage source or time varying excitation source initially is applied to one edge of the resistive sheet in one coordinate direction while ground reference is applied to the oppositely disposed edge. This procedure then is reversed for the first coordinate direction and the combined readings may be used to determine one coordinate. The procedure then is carried out in the opposite coordinate sense. For example, arbitrarily designating that the output of stylus 32 is to be designated XPLUS when an alternating current source is applied along the x+ coordinate edge of sheet 30 while simultaneously ground is applied to the opposite, x— edge; arbitrarily designating XMINUS to be the signal at stylus 32 when the opposite condition obtains wherein the alternating current source is applied along the x— edge of sheet 30 and ground is applied to the oppositely disposed, x+ edge; designating YPLUS to be the signal at tracer or stylus 32 when the alternating signal source is applied to the edge of resistive sheet 30 at the y+ edge location and ground is applied to the opposite or y— edge; and designating YMINUS to be the signal derived at tracer 32 when the alternating current source is applied along the edge of resistive sheet 30 at the y— edges thereof, while ground is applied along the edges of sheet 30 represented at the y+ coordinate paired coordinate signals may be derived. For example, the signal values may be employed with a difference/sum coordinate defining ratio, to derive position signals for any position of the tracer 32 on surface 30 as follows:

$$\text{Position } x = \frac{(XPLUS) - (XMINUS)}{(XPLUS) + (XMINUS)}$$

$$\text{Position } y = \frac{(YPLUS) - (YMINUS)}{(YPLUS) + (YMINUS)}$$

During any of the data collection procedures, one set of coordinate regions or edges of the resistive sheet 30, for example, the y+ and y— edges are permitted to "float" in electrical isolation while the oppositely disposed or, for example the x+ and x— coordinate border regions, are operated upon by alternately applying ground and the a.c. source thereto. The imposition of the a.c. signals as well as application of the ground couplings are carried out through contacts provided as somewhat elongate but spaced apart pads positioned along the borders. FIG. 4 shows an array of four of such pads or contacts along the x+ border at 34, while an oppositely disposed array of such pads for the x— border region is represented at 36. Correspondingly, an array of four spaced apart pads or contacts along the y+ designated border region is shown at 38, while a corresponding array of contacts or pads along the border region designated y— is shown at 40.

Each of the contacts or pads within the array 34 thereof at the x+ border region is connected to one side of a single-pole, single-throw analog switch of an array thereof shown at 42. Similarly, each pad or contact of the array 36 at the x— border region is connected to a corresponding single-pole, single-throw analog switch of an array thereof shown generally at 44. Correspondingly, each pad or contact within the array 38 at the y+ border region is connected to a corresponding single-pole, single-throw analog switch of an array thereof shown generally at 46, while the oppositely disposed y— border region contacts or pads of array 40 are each coupled to a corresponding single-pole, single-throw analog switch of an array 48 thereof.

The a.c. source for exciting the resistive surface 30 is represented at 50 having an output at line 52 extending through line 54 to the inputs of two analog single-pole, single-throw switches 56 and 57. The output side of switch 56 is coupled to a bus 58a which, in turn, extends in common to the inputs of each analog switch within arrays 46 and 42. Correspondingly, the output of analog switch 57 extends via bus components 60a and 60b to the common inputs of the analog switches within arrays 44 and 48.

The ground established for operating the digitizer incorporating resistor sheet 30 is derived from line 82 which extends through line 64 to the inputs of two single pole single throw analog switches 66 and 67. The output of switch 66 is coupled to bus component 58b leading through component 58a in common to the inputs of the analog switches within arrays 42 and 46. Similarly, the output of analog switch 67 is coupled to bus component 60b which, in turn, is connected in common to the inputs of the analog switches within arrays 48 and 44.

Figure 5:
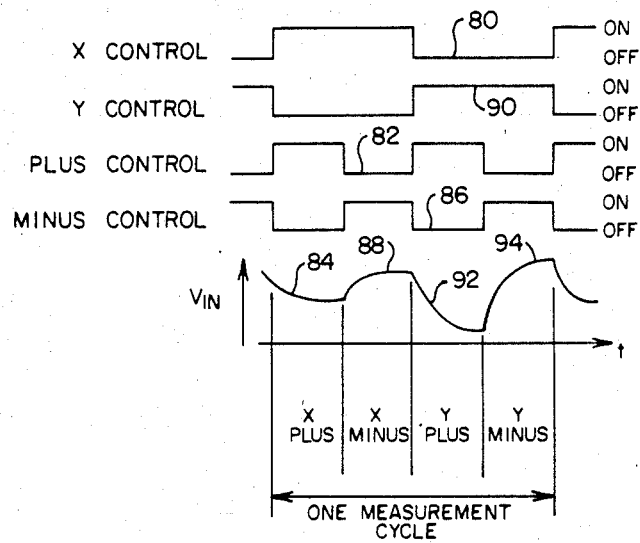
FIG. 5 is a schematic representation of timing and control sequence curves for sequential operational or data modes of the apparatus of the invention.

All the above-described analog switches are actuated by logic compatible voltage signals developed at the output of a central control including a microprocessor as represented at block 70. Thus, by appropriate signal actuation through lines 72 and 73 labelled "X CONTROL", all of the switches along the x axis as at arrays 42 and 44 may be closed or opened simultaneously. In similar fashion, the control 70 may assert an actuating signal from along lines 74 and 75, labelled "Y CONTROL", to simultaneously open or close all of the switches along the y axis as represented at arrays 46 and 48. Control 70 also may assert simultaneous actuating and deactuating signals from along lines 76 and 77, labelled "PLUS CONTROL" to switches 56 and 67. By such actuation, the a.c. source may be applied to bus 58a through the y+ switch array at 46 and the oppositely disposed y— switch array 48 may be coupled to ground through bus 60b simultaneously. In similar fashion, the control 70 may assert an actuating signal along lines 78 and 79 labelled "MINUS CONTROL" to effect the actuation of switch 57 and passage of a.c. source 50 signals through bus 60b to x— switch array 44, while, simultaneously, connecting the switches of array 42 at the x+ border region with ground through bus 58b. By alteration of the "X CONTROL" and "Y CONTROL" outputs from control 70, the opposite form of actuation may be obtained. In this regard, reference is made to FIG. 5 wherein the modes of operation for carrying out one measurement cycle are illustrated in timing diagrammatic form. Thus, it may be observed that XCONTROL lines 72 and 73 provide an on or actuating signal simultaneously with a corresponding on signal at PLUS CONTROL lines 76 and 77 as represented at diagram 82, to develop an X PLUS signal as represented at curve 84 during a first one-quarter interval of one measurement cycle. Similarly, an "on" condition for the x control signal as represented at diagram 80 is generated in combination with a corresponding "on" actuation signal at MINUS CONTROL lines 78 and 79 as represented at diagram 86. The "X MINUS" signal thus developed is represented at curve 88 and represents the second quarter of the measurement cycle. The third quarter of the measurement cycle is shown developing the "Y PLUS" signal 92 by the assumption of an "on" or actuating status at the Y CONTROL lines 74 and 75 as represented at diagram 90. Simultaneously with this on status as represented at diagram 90, the PLUS CONTROL lines 76 and 77 carry an actuating signal as represented by the on status at diagram 82. Finally, the "Y MINUS" signal 94 is developed for the fourth quarter with the assertion of an actuating or on status at the Y CONTROL lines 74 and 75, as represented at diagram 90 in combination with a corresponding actuating or on condition at the MINUS CONTROL lines 78 and 79 as represented at diagram 86.

With the arrangement thus depicted, the source 50 is applied first to one border and then the opposite border in an x coordinate direction and subsequently the same arrangement is provided for the y coordinate direction, the switches in the coordinate direction not being employed being open to permit that pair of oppositely disposed borders to "float" and avoid such phenomena as pin cushion distortion. Through the utilization of the noted bus connections, the number of switches otherwise required to carry out this switching logic is advantageously reduced over switching systems requiring two discrete switches for each contact or electrode within the border region arrays thereof. The advantageous reduction in the number of switching components is particularly useful as the size of the tablets carrying resistive areas as at 30 increase in size, inasmuch as the number of required bus connected switches remains the same. Generally, for a tablet typically having a 12 inch×12 inch surface dimension, the number of switches required will be reduced by 40 percent over earlier designs and this reduction becomes more significant as the size of the tablets increase.

Generally, the resistance layer as at 30 will have a resistance selected in a value range of about 100 to 10,000 ohms per square. However, because of frequently encountered interference phenomena, for example from the operator's hand or portion of the body touching the surface or coming close to it, lower resistance values are preferred. However, from the standpoint of avoiding the phenomena of stray capacitance or environmental noise input, it is desirable that this resistance value be as low as possible, 250 to 500 ohms per square being considered most appropriate. The selection of frequency for the source 50 also is a matter of consideration with respect to the avoidance of interfering frequency levels most constantly encountered in typical uses of the digitizer devices such as at 28. As an initial consideration, excitation signals below about 5 KHz are undesirable because of the very poor capacitive coupling between the tracer or stylus 32 and surface 30. However, for excitation signals above about 2 MHz, the cost of electronic components treating such frequencies becomes undesirably high. Further, at medium frequency ranges, for example at about 200 KHz, interference may be encountered from devices normally associated with the environment of digitizers. In this regard, harmonics from visual display terminals (VDT) at about 200 KHz have been witnessed, such interfering signals being developed from synchronization pulses and the like.

In general, the control at block 70 containing a microprocessor and related components may be characterized as treating signals in a digital format. However, the inputs to the control 70 from which digital coordinate pair information is developed are pre-treated in analog fashion. In this regard, note that the locator or pick-up 32 is coupled by shielded cable 96 which is directed to the input of an impedance matching network represented at block 98 and an associated preamplification stage 100. The pre-amplification stage has R-C networks at its feedback and input which are varied to achieve optimal input matching amplified position signals being derived from this stage. In effect, the distributed resistance of sheet 30 and the gap defined capacitive coupling at the pick-up 32 exhibit the transfer function of an R-C network. It is necessary to direct the signal output of that network into a corresponding matched network which has the inverse of that transfer function to achieve an optimal coupling.

Because the quality of coupling between the pick-up at 32 and resistive sheet 30 varies with the type of pick-up utilized, it further is necessary to achieve a constancy of the received position signal to provide for uniform processing. For example, where a tracer or cursor incorporates a flat receiver ring which is positioned about the coordinate point of interest. It has been found that the coupling achieved thereby is excellent. Conversely, where a pointed stylus is used as the locator, a coupling of lesser quality is achieved. Thus, by appropriately coding the attachment of cable 96 with the preliminary signal treatment stages, an automatic attenuation of the received signal corresponding with the pick-up selected may be provided and this variable or selective attenuation of the received signal is represented at block 102. Upon being adjusted at stage 102, the signal then is filtered at a band pass filter represented at block 104 which is structured in accordance with the frequency of excitation at the source 50 and which provides filtered position signals.

Because variations in the distance above the surface of resistor sheet 30 of tracer or pick-up 32, the system provides an automatic gain control represented at block 106. This automatic gain control over the signal is controlled from the control function represented at block 70 through an association represented by line 108. Following the automatic gain control stage 106, the resultant gain controlled position signals are converted to a d.c. level as represented at block 110. The signal then is directed to the input of a sample and hold circuit represented at block 112. Circuit 112 serves to capture the voltage applied at its input and provides a degree of what may be termed as "software freedom" wherein the operation of the microprocessor containing control 70 may be somewhat deactivated or held in a tight loop wherein the noise level of the digital components of the system is significantly reduced during initial analog signal capture. This permits the analog components of the system to operate in a more quiet electronic environment. Thus, at such time as the d.c. level data (d.c. level position signals) is developed, such level information then is retrieved from the sample and hold circuit 112 to be converted to a digital binary value by an A/D conversion circuit represented at block 114. The thus-developed digital valuation (digital position signals) at circuit 114 is directed via a multi-lead bus to the control at 70 as represented at line 116.

Upon receipt of the digital position signals from bus 116, the control function represented at block 70 carries out the earlier-discussed difference/sum ratio development, accommodates for amplification offset and corrects for nonlinearities occasioned by variations in the resistive layer 30. This latter correction is carried out uniquely through a two-part system wherein the resistive surface 30 initially is tested in the physical domain with a locator type of device at each point along a grid-like array of physically locatable positions to derive signal domain digital position signals. These digital position signals, which may be considered to be within a signal domain, then are adjusted to establish a regularly incremented sequence of address values within that same signal domain. In effect, a grid within that signal domain which encompasses the actual outputs found in the signal domain is developed. Then, with respect to each of these address values, the physical domain coordinate values with respect to each are computed and positioned in read only memory in look-up table form with respect to each of the noted address values. The read only memory then accessed in a correcting sub-routine by the microprocessor components of the control 70. Thus, for any given location of the locator 32, the control can access the memory and derive the noted computed physical domain coordinate values. The control then carries out a two-dimensional interpolative weighting of those computed physical domain coordinate values in correspondence with the given or actual signals received from locator 32.

Because the computed physical domain coordinate values and the address values are derived and placed in memory as part of the manufacture of the system, (off-line) the correction procedure may be carried out by simplified computational processes requiring relatively inexpensive microprocessing components and within a time span fully acceptable for intended digitizer or related uses. The resultant coordinate pair or digital data signal outputs may be provided in serial fashion at a serial port represented at line 118 or in parallel fashion as represented at line 120. These outputs are coupled then with a host computer facility.

As indicated earlier herein, a first structuring for the digitizer apparatus 28 is as illustrated wherein the resistive sheet 30 is excited from an a.c. source. However, the system also will work where the cable 96 of pick-up 32 is coupled to the source 50 and injects a signal at a desired coordinate location. For operation in the architecture, line 52 will be coupled to the analog or signal pretreatment components commencing with block 98.

Referring to FIG. 6, a hand-held locator or tracer is represented generally at 130. Tracer 130 includes a transparent plastic base sheet member (not shown) which is nestably secured within a single molded top housing portion which is represented in general at 132. Formed, for example, of transparent acrylic, the forward portion 134 of the transparent base is configured having cross-hairs 136 and a sighting circle 138. This sighting circle 138 and the cross-hairs serve to aid the operator in positioning the device 130 at appropriate locations over the resistive surface 30. Adhesively attached to the base sheet member noted above is a printed circuit board, the bottom surface of which includes an annular ring positioned beneath bezel 140 which may be utilized for reception in the case of the first embodiment above disclosed or for transmission of a.c. signals for the alternate embodiment of the invention. The upwardly disposed surface of printed circuit board contains leads coupling the annular ring to shielded cable 96 as well as leads providing connection to and forming part of an array of finger actuated switches 142. Each of the switches at array 142 may be, for example, provided as an elastomeric, over-center type having a positive tactile feedback when actuated. The tracer 130 further carries a light emitting diode 144 which is illuminated at such time as data representing a coordinate pair is received and accepted by the host computer facility with which the apparatus 28 is operationally associated. The switches 142 may have any of a variety of designations, for example representing the development of coordinate data for a series of variously colored print-outs. It may be noted from the size of the annular ring location 140 that the active writing area for the resistive sheet 30 must be positioned about 4 cm inwardly from the actual edge of the ITO layer to avoid distortion due to edge effects and the like.

Figure 8A:
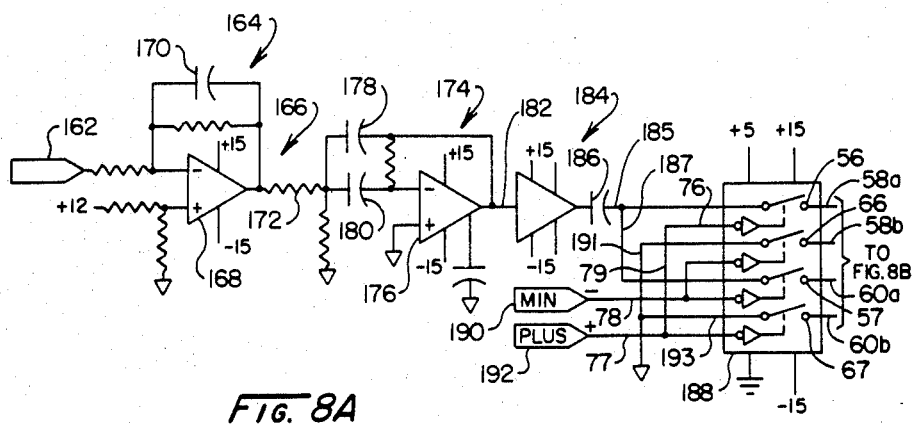
FIGS. 8A-8B are a schematic drawing of the drive and switching electronic components of the system of the invention.
Figure 8B:
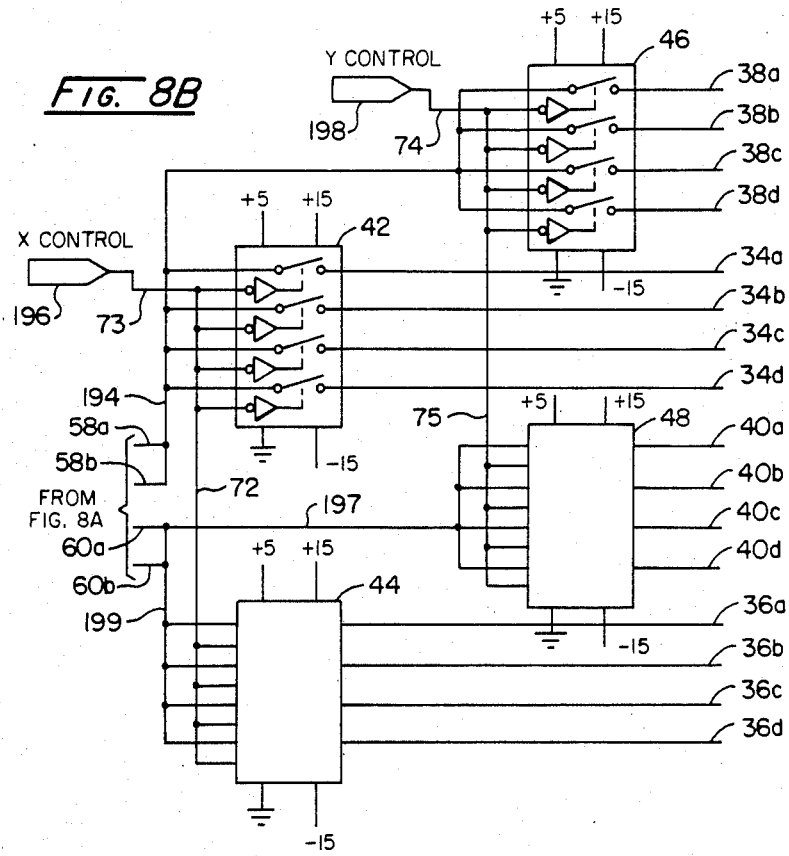

Now looking to the above-discussed circuit at an enhanced level of detail, reference is made to FIGS. 8A and 8B elaborating upon the switching system described in conjunction with FIG. 4. Where appropriate, the same component numeration is retained in this more detailed disclosure. The oscillatory signal which is developed in conjunction with the a.c. source 50 is derived from the control 70 as a squarewave and is introduced via connector 162 to a signal treatment network represented generally at 164. For the preferred embodiment wherein the resistive surface 30 is excited, the frequency value asserted at connector 162 will be about 211 KHz. On the other hand, where the surface 30 is used in conjunction with a mode wherein excitation occurs through the stylus or tracer, then that frequency value essentially would be doubled. The initial stage of network 164, as shown at 166, utilizes an operational amplifier 168 which is configured by capacitor 170 as an integrator serving to remove initial harshness or harmonic content from the squarewaveform which normally will run from 0 to 5 v. The stage also serves to center the waveform so as to run +2 v in symmetrical fashion. The thus treated signal then is directed through a resistor 172 to a band pass filtering stage represented generally at 174. In this regard, the filter stage 174 includes an operational amplifier 176 configured in typical filter fashion utilizing capacitors 178 and 180. A band pass filtering stage is used at this location in the signal treatment network 164 first to remove all harmonics and next to eliminate any d.c. biases which may evolve from the first stage 166. Generally, the stage 174 has a Q of 10 centered at the noted 211 KHz base frequency inputted at connector 162. The output of stage 174 at line 182 is directed to the input of a current driver stage represented generally at 184. Provided, for example, as a type LH002 current driver, the stage 184 serves to drive the impedance of resistive surface 30 and, in effect, serves as a buffer stage. The output of driver stage 184 is shown coupled through capacitor 186 and line 185 to the initial two of the earlier-described switching stages 56 and 57 through lines 185 and 187. Switches 56 and 57 are seen to be of an analog variety and are combined with earlier-described switches 66 and 67 in a quad package thereof represented at 188. Control over switch 57 is carried out from the control function 70 by selective assertion of a logic compatible voltage signal from line 78 through a connector 190, while corresponding control over switch 56 is provided from the control 70 through lines 76 and 77 carrying a signal from connector 192. In similar fashion, switch 66 is selectively coupled to ground via line 191 and is controlled by the assertion of a logic compatible voltage signal from line 79 coupled through line 78 to connector 190. Finally, switch 67 is selectively coupled to ground through lines 193 and 191 is controlled from line 77 which is, in turn, coupled through connector 192 to control 70.

Figure 9A:
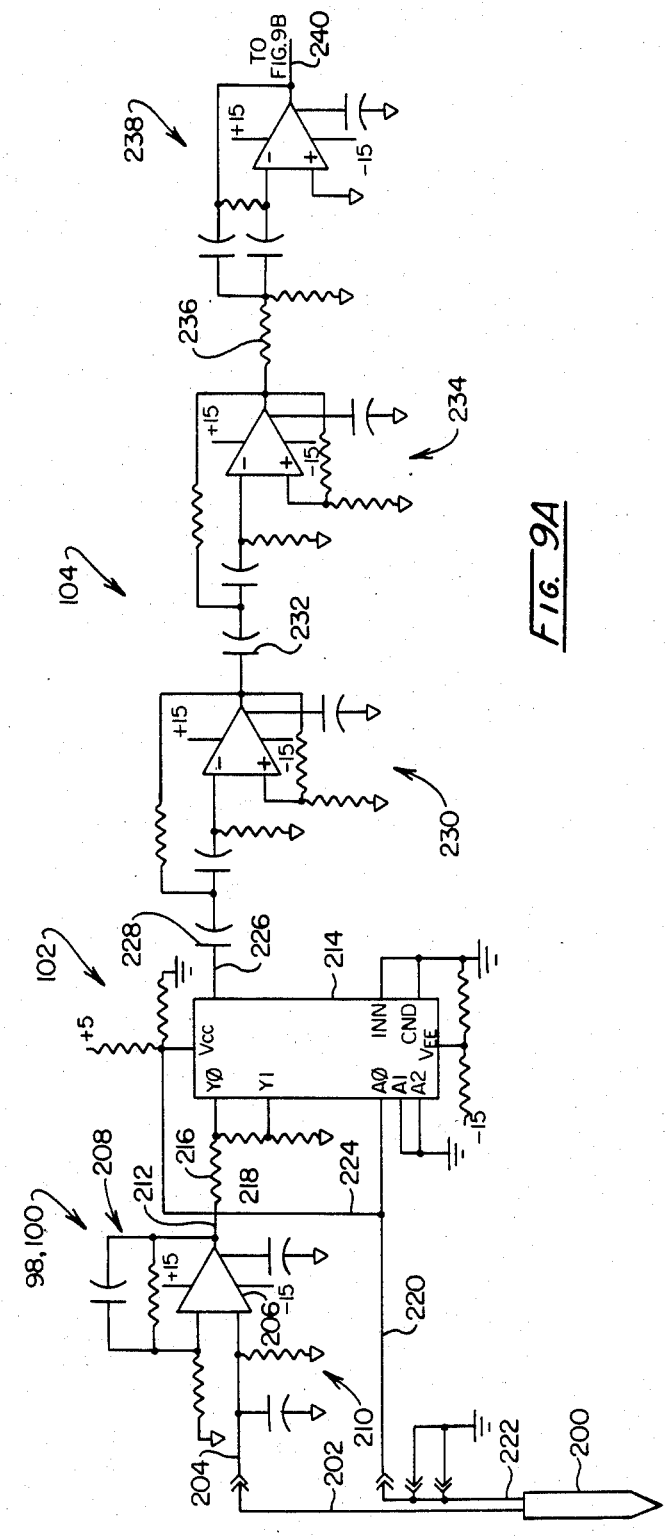
FIGS. 9A-9C are electrical schematic diagrams showing the analog treatment components of the system of the invention.
Figure 9B:
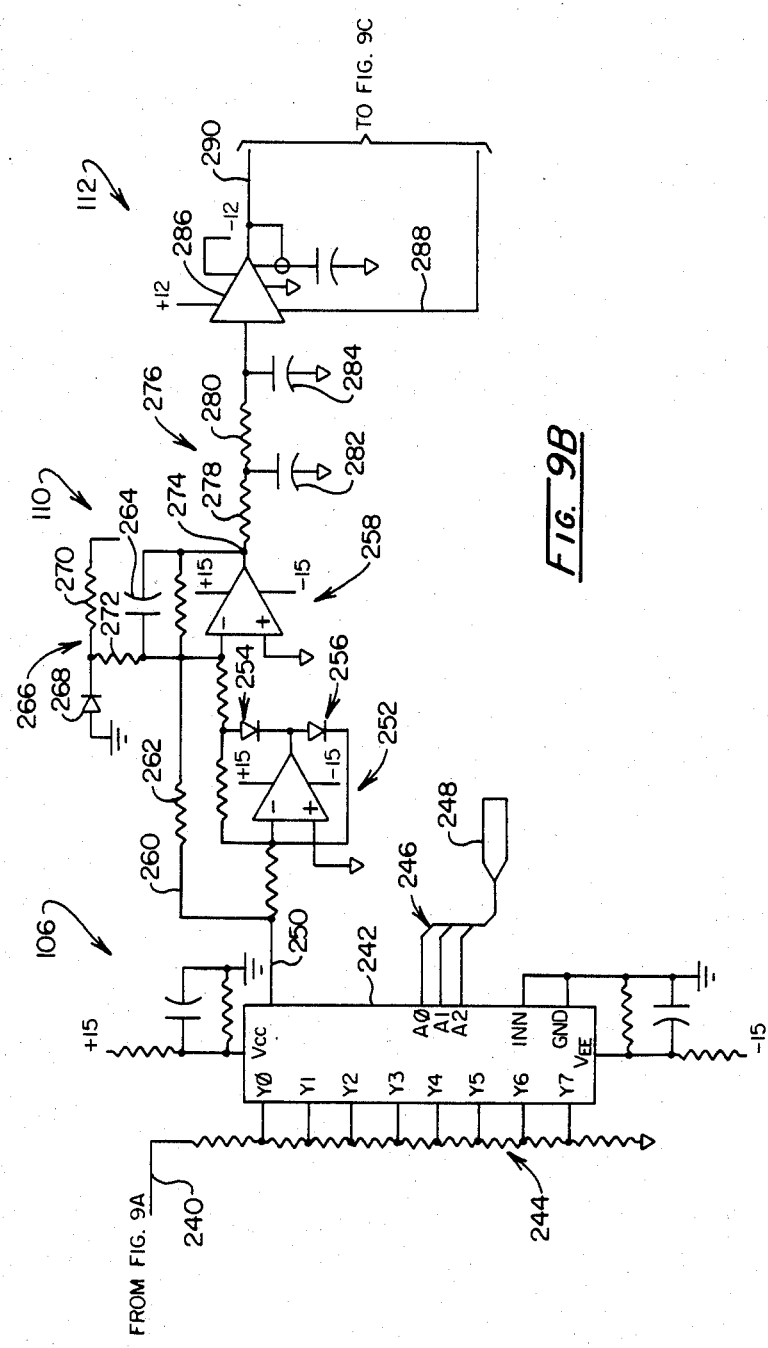
Figure 9C:
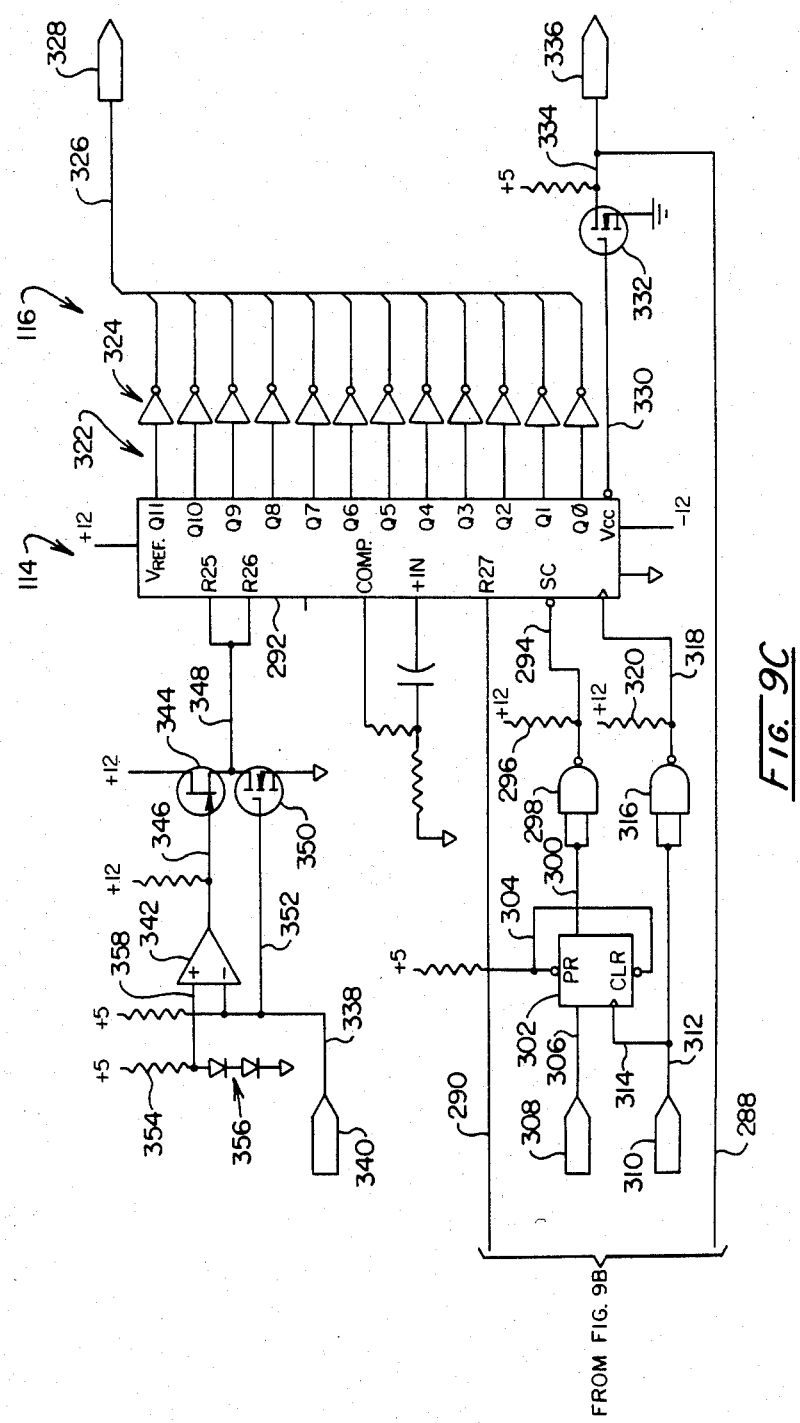

Looking additionally to FIG. 8B, it may be observed that the a.c. excitation signal is directed selectively through switch 56 and line 58 to line 194 and thence to the switching outputs of switch array 42 having outputs connected, as shown, to contacts or pads 34a–34d (FIG. 6). Switch array 42 selectively receives a logic compatible voltage signal from the control 70 through connector 196 and combined line 73 and 72. It may be recalled that such switching activates the x+ coordinate border region to receive a.c. excitation. In similar fashion, switch 57 supplies a.c. excitation signals through lines 60a and 197 to quad switch array 48 in conjunction with the development of y— coordinate information. Control over the four switches of array 48 is provided from control 70 through lines 74 and 75 and its YCONTROL connector 198. Similarly, line 60a is directed to line 199 and to the inputs of the switch array 44 providing for x— coodinate excitation of resistive sheet 30. Switch array 44 is, in turn, controlled from lines 72 and 73 and the XCONTROL input as represented at connector 196 from control 70. The ground coupling to switch arrays 44 and 48 is provided from line 60b emanating from switch 67 which is selectively actuated from control 70 through connector 192. Referring to FIGS. 9A-9C, the analog signal treating components of the apparatus 28 are revealed in detail. These figures should be considered in side-by-side adjacency in their alphabetical sequence as represented by the connecting labels thereon. The output of the tracer or stylus as described as pick-up 32 in FIG. 4 is coupled as shown in FIG. 9A through a connector 200 and line 202 to input line 204 of the combined preamplification and impedance matching network described earlier at 98 and 100. Preamplification stage 100 is comprised of an operational amplifier 206 having RC networks 208 and 210 in its respective feedback and input paths. As discussed above, it is important to achieve an impedance matching between the signal pick-up device and the input of the analog circuitry. With the one embodiment of the invention, desirable signal-to-noise ratios are achieved with the pick-up 32 operating in a receiving mode, inasmuch as the pick-up device itself is a high impedance device and it is being driven through a capacitive coupling with the resistive surface 30 itself. Conversely, when the exciting signal is generated through the tracer or stylus, the capacitive coupling at the resistive surface represents a high impedance that becomes a voltage drop in conjunction with a system wherein a relatively small signal is being injected at surface 30. Thus, undesirable signal loss occurs across the coupling.

Because the coupling between resistive surface 30 and a stylus is not of the quality as a corresponding coupling utilizing a tracer as described in conjunction with FIG. 6, a selective attenuation is required with respect to the preamplified signal developed at output line 212 of stage 100. To provide this selective attenuation, a type 4051 analog switch is employed as represented at 214. The input to this circuit from line 212 is provided through resistor 216 which is directed either to input pin Y0 or pin Y1 coupled to resistor 218. Thus, where a tracer as described in conjunction with FIG. 6 is provided, line 220, extending to the A0 terminal, will not be grounded from line 222 and a +5 v signal will be impressed at line 220 from line 224 to provide for the receipt of signals from line 212 through the Y1 terminal to be attenuated accordingly and presented at output line 226. On the other hand, where a stylus is utilized, then line 220 is coupled to ground from connection line 222 and an unattenuated signal is received from line 212 into terminal Y0 for presentation at output line 226.

Output line 226 is coupled through capacitor 228 to band pass filtering network 104. Generally, the network 104 includes a high pass filter stage 230 providing a very sharp leading filter edge which is coupled in cascade fashion through capacitor 232 with a band pass stage 234. Each of the stages 230 and 234 does one pole realization and the output of the stages at line 236 is directed to a filter stage 238 which is structured in substantially identical fashion as earlier described filter stage 174 (FIG. 8A). Generally, the stages 230, 234 and 238 are configured about operational amplifiers of type LF356 for the preferred embodiment of the invention. However, where higher frequencies, for example in the range of 400 KHz are utilized (for configurations wherein the tracer or stylus injects a.c. signals to resistive sheet 30) then type 2625 operational amplifiers preferably are employed.

The output of the band pass filter 104 at line 240 is directed to the input of automatic gain control stage 106 as seen in FIG. 9B. This automatic gain control is utilized inasmuch as there is a wide dynamic range of signals asserted at the input to the analog portion of the instant circuit. Such range of signal variation is occasioned by the variations in elevation of the tracer or stylus 32 over the resistive sheet 30 during use, as well as variations in the interposition of dielectric material such as paper and the like between the pick-up device and the resistive surface 30. Because the signals ultimately are converted to digital form, the imposition of a gain control is necessitated. To provide this gain control, a selector network 242 is employed which may be, for example, a type 4051. The Y0-Y7 input terminals of the network 242 provide taps into a resistor networt 244 the input to which is coupled to line 240. By asserting an appropriate binary control at terminals A0-A2 from leads 246 and connector 248, the control 70 may elect or tap the resistor network at any of the input terminals Y0-Y7 to provide the thus-selectively attenuated signal at output line 250. Network 242 also may be controlled to assert a ground level signal at line 230 for purposes of offset measurement. Because of a hysteresis characteristic evidenced in such devices as at 242, it will be observed that the program electing the appropriate tap is adjusted accordingly.

Output line 250, carrying a gain adjusted signal, is directed to the input of a full-wave precision rectifier network represented at 110. Rectifier network 10 is comprised of two stages, the initial stage at 252 including diodes 254 and 256 at the output thereof to provide half-wave rectification. This half-wave rectified signal then is directed to the second stage 258 having a feedback including line 260 and resistor 262 to evolve full-wave rectification. Averaging is provided through the inclusion of capacitor 264.

Stage 110 further includes an offset biasing network 266 including diode 268 and resistors 270 and 272. This network is coupled to line 260 and serves to assert a positive bias upon all of the d.c. levels in the analog signal treating system thus far described. All of the active components of the system have a certain offset voltage which will constitute an error. Because that voltage may have a negative value and the subsequently encountered analog-to-digital converter devices can only convert positive values, an assurance of the latter positive value is provided by his arrangement which then is accommodated in the overall control program of the system. For example, the input at line 204 can be grounded and the voltage ultimately evolved converted to a digital level which can be assessed and assigned as an error a subtractive correction. Stages 252 and 258 may be structured utilizing conventional type LF356 operational amplifiers.

The output of the converter network 110 at line 274 is directed through a two-pole low pass filter represented generally at 276 comprised of resistors 278 and 280 operating in conjunction with respective capacitors 282 and 284. The thus-filtered output then is directed to a sample and hold network 112 having as its principal component an integrated sample and hold circuit 286 which, for example, may be provided as a type LF398 and which is selectively actuated to hold the signal at its input from line 288 extending to the control 70. Serving advantageously as a stage isolating the relatively noisy activities of the microprocessor or digital components of the system from the analog or positional signal generation and receiving components, the output of the sample and hold circuit 286 at line 290 is directed in controlled fashion to the R27 terminal input of analog-to-digital converter circuit 292 of conversion circuit 114 as represented in FIG. 9C. Powered at a +12 v level, the converter 292 commences carrying out a conversion of the signal at line 240 upon receipt of an appropriate start convert signal at its SC terminal from line 294. Line 294 is held at +12 v through pull-up resistor 296 which level is buffered by a type 74LS38 open collector buffer 298 which receives its common input from line 300 extending, in turn, to a flip-flop 302 which may, for example, be a type 74HC74. The clear, CLR, terminal of flip-flop 302 is maintained at a logic high by line 304 and the device is triggered by a start convert signal at its input line 306 which is coupled to control 70, as represented by connector 308. The flip-flop 302 functions to synchronize the converter 292 with the clock of control 70 and this is carried out by presenting a 102.4 KHz signal input to the flip-flop from control 70 as represented by connector 310 and lines 312 and 314 extending to the opposite input thereto. The signal imposed at line 294 is not a continuous logic level inasmuch as the signal causing the commencement of conversion is cleared by the continuously running clock at line 314 asserted at the flip-flop 302. It may be noted that line 312 also provides a clock input to the converter 292 through connection with open collector buffer 316 and line 318 which is held normally high by pull-up resistor 320 coupled to +12 v. The 12-bit conversion output of converter 292 is present at its Q0-Q11 parallel outputs as represented by line array 322. The output lines within array 322 are individually converted to five volt logic by type 74C901 buffers coupled thereto as at the array thereof shown at 324. The resultant parallel 12-bit output is directed to a data bus 326 for return to the control 70 as represented by connector 328. At such time as any conversion is completed by converter 292, the output terminal V-cc at line 330 assumes an active logic low status which active low is converted from 12 volt to 5 volt logic levels by field effect transistor 332. Transistor 332 presents the signal line 334 which is directed to the control 70 as represented by connector 336. Note that line 288 is coupled to the same connector through connection with line 334. Transistor 332 may, for example, be present as a type SD1117N. When line 294 assumes an active logic low, then the V-CC terminal at line 330 follows by going high in acknowledgment of the commencement of conversion. Upon being converted to a lower level by transistor 332, the resultant signal is returned to sample and hold circuit 286 to hold the signal at line 290. At the completion of a digital conversion, the signal at terminal V-CC at line 330 assumes an active low logic level which is witnessed at line 334 and which is poled by the control 70. In effect, this is a data ready signal. The same logic level change is witnessed at line 288 and at the sample and hold network 286.

Where resistive sheet 30 is used, for example, in conjunction with a 12 inch×12 inch active area format, a 13-bit A/D conversion is required of the 12-bit converter component 292. To develop this thirteenth bit, the normally 8 v full scale signal at input line 290 is treated by reference within the converter itself to be either in a 0 to 4 v or 4 to 8 v range over which a 12-bit conversion is made. The control 70 determines whether the signal at line 290 is below 4 v and if that is the case, a thirteenth bit is assumed to be 0. Where the signal at line 290 above 4 v, then an additional conversion is carried out wherein the reference in the converter 292 is altered and a thirteenth bit is generated. This determination is made through the utilization of internal resistances within converter 292 as accessed from terminals R25 and R26. These terminals are connected either to ground or +12 v in dependence of the need for the thirteenth bit in the higher voltage range. Upon control 70 determining whether the input at line 290 is above or below the noted half scale or 4 volts. This being the case, a signal is presented at line 338 from connector 340 to one side of a typ LM339 comparator 342. Comparator 342 provides a level shifting from the computer logic to the +12 v levels of the converter 292. Accordingly, with the noted signal at the negative input to comparator 342, a type J111 FET the gate of which is coupled to the output of comparator 342 through line 346 will be activated to provide a +12 v association with the resistors coupled through line 348 to the R25 and R26 terminals of converter 292. Conversely, the internal resistors are coupled to ground by virtue of the signal at line 338 being conveyed to FET 350 in consequence of the signal at line 352. As is apparent, the opposite input to comparator 342 is adjusted by resistor 354 and diode pair 356 coupled thereto through line 358.

Figure 7:
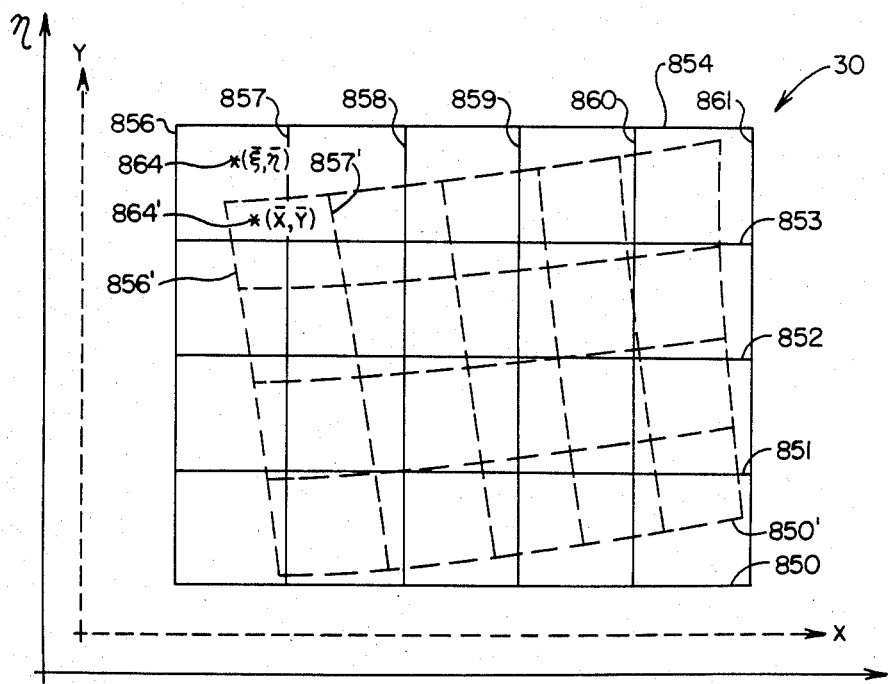
FIG. 7 is a schematic representation of a resistive surface having a grid position array and a distorted grid array superimposed thereover.
Figure 10:
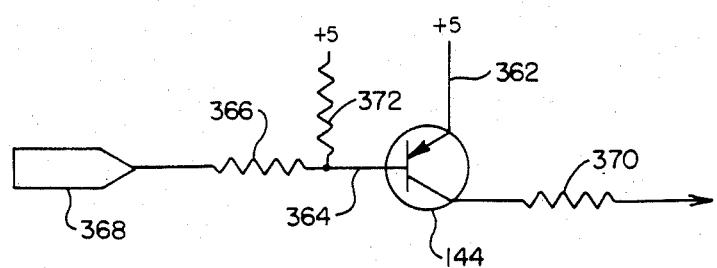
FIG. 10 is a schematic circuit drawing showing the LED drive circuit of the system of the invention.

Looking to FIG. 10, a small network for activating the light emitting diode 144 on the tracer embodiment shown in FIG. 7 is revealed. LED 144 may, for example, be a type MPS2907 having its emitter collected to +5 v as represented at line 362 and its base coupled through line 364 and resistor 366 to control 70 as represented by connector 368. The emitter of transistor 144 is coupled through resistor 370 to a power supply ground, while the base connecting line 364 is coupled to +5 v through pull-up resistor 372. As is apparent, when line 366 assumes an active low status, the LED 144 is illuminated.

Figure 11B:
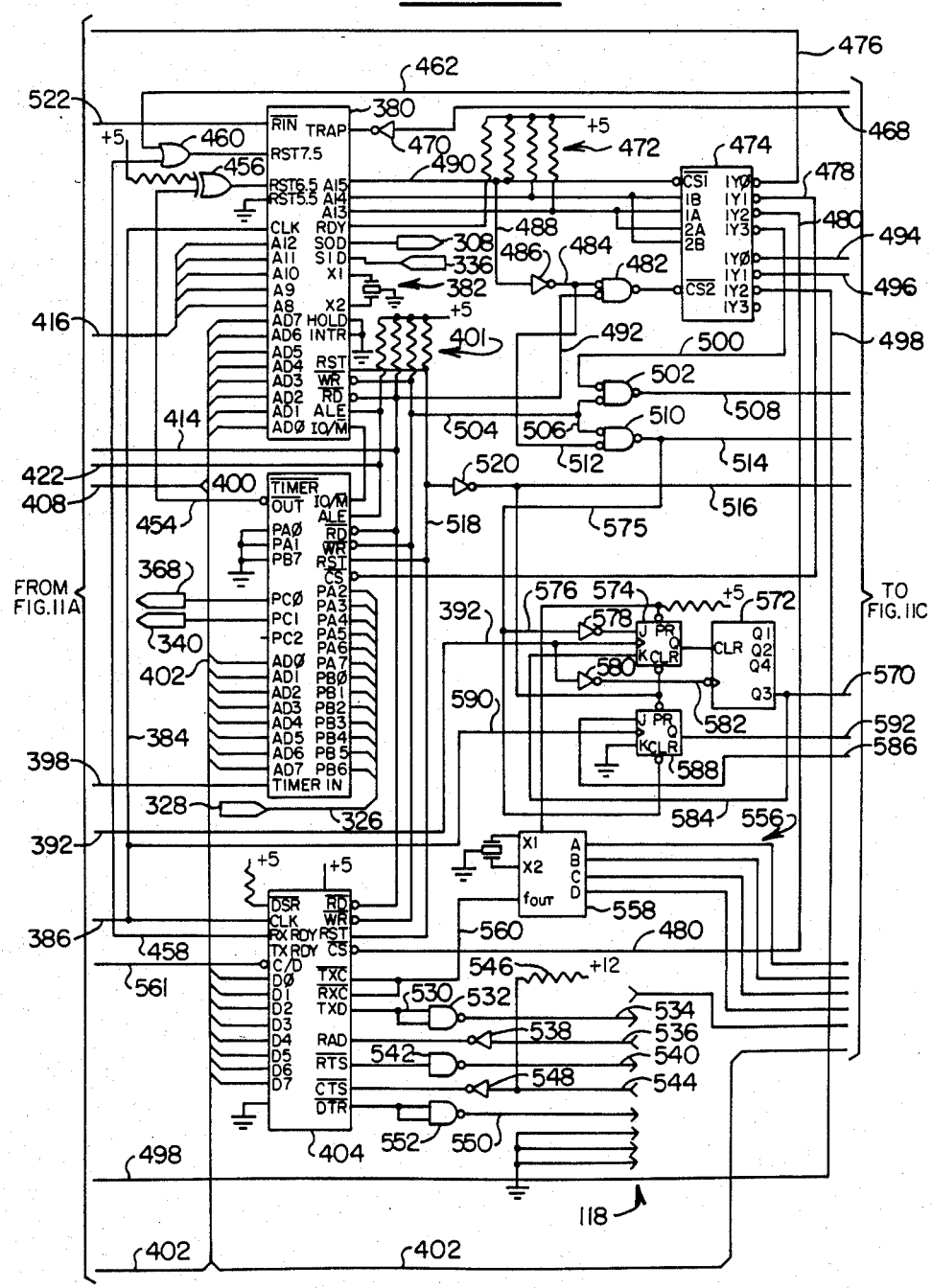

Referring to FIGS. 11A–11C, the digital components of the circuit of the digitizer 28 are revealed in enhanced detail. These figures should be positioned in adjacency in alphabetical order as represented by the connective labels thereon. Looking initially to the centrally positioned FIG. 11B, the microprocessor under which the circuit operates is represented at 380, while the microprocessor shown is a type 8085, it is considered that a type 8088 of slightly improved capability is to be preferred for the instant application. The microprocessor 380 is driven at its X1 and X2 terminals from a crystal controlled oscillator 382 deriving a 6.5536 MHz output. In consequence, the clock, CLK, terminal thereof provides a corresponding output at lines 386 which is coupled to the input of a divide by four counter 386. One of the four outputs of counter 386 is tapped at line 388 which is coupled to earlier-described connector 162 (here shown primed) to provide the approximately 409.6 KHHz squarewave input to the excitation filter stage described in FIG. 8A at 164 for the embodiment of the invention wherein excitation is injected into surface 30 via tracer or stylus 32. On the other hand, for the first embodiment, the counter 386 is tapped at line 390 leading to line 392 and the same connector 162 for developing the 204.8 KHz frequency signal desired for the instant preferred embodiment wherein the resistive surface 30 itself is excited. Line 390 also is directed to the input of another divide by four counter 394, the output of which is tapped at line 396 leading to connector 310 described in conjunction with flip-flop 302 in FIG. 9C. The frequency of the output signal at connector 310 will be recalled to be 102.4 KHz. Another output of counter 394 is provided at line 398 which is directed to the "TIMER In" terminal of a composite random access memory (RAM) and timer circuit 400 (FIG. 11B) which may, for example, be provided as a type 8155H. Composite circuit 400 additionally provides 12 bits of input/output port function for utilization by the microprocessor 380. To effect their control association, the commonly labelled IO/M, ALE, RD, WR, and RST terminals of composite circuit 400 and the microprocessor 380 are coupled in common. Note that these common connections 380 are coupled with +5 v supply through an array of discrete pull-up resistors 401. The RAM input terminals PA2-PA7 and PB0-PB6 of circuit 400 are coupled with bus 326 which, in turn, is directed o connector 328 for receiving the parallel digital output of analog-to-digital converter 292 (FIG. 9C). The address/data terminals AD0-AD7 of circuit 400 are coupled via common address/data bus 402 to the corresponding ports of microprocessor 380 as well as to the corresponding data ports D0-D7 of a universal asynchronous receiver transmmitter (UART) 404. Terminals PC0 and PC1 of circuit 400 are coupled to respective connectors 368 and 340 which, in turn, actuates LED 144 (FIG. 10) and provide bit 13 inforamtion to converter 292 (FIG. 9C). As noted earlier herein, LED 144 is energized only when a coordinate pair signal has been transmitted to the host computer. Bus 402 is shown to continue to an array of discrete pull-up resistors 406 coupled to +5 v supply (FIG. 11A). Bus 402 additionally is coupled, as represented by connector line 408, to a continuation of the bus at 410, one component of which is directed to the output terminals 00-07 of a programmable read only memory (PROM) 412. PROM 412 may be provided, for example, as a type 2764. The device is enabled at its OE terminal from line 414 leading, in turn, to the write, WR terminal of microprocessor 380. The higher level address terminals, A8-A12 of PROM 412 are coupled by bus 416 to the corresponding address terminals of microprocessor 380, while the lower order address terminals A0-A7 are coupled by bus 418 to the respective terminals 1Q-8Q of an address latch or buffer 420. Latch 420 may, for example, be a type 74HC373 and is shown having its data terminals, 1D-8D, coupled to bus 410 leading to microprocessor 380 via bus 410. The G (enable) terminal of catch 420 is coupled via line 422 to the read, RD terminal of microprocessor 380. Latch 420 is required for the instant circuit inasmuch as microprocessor 380 has a multiplexed address and data bus 402 and address information must be retained or captured.

Bus 410 extends additionally to the Y terminal inputs of a buffer 424, the opposite or A terminal inputs to which are coupled through lead array 426 to the individual switches of dip switch array 428. Note that each of the leads within array 426 is coupled with a corresponding pull-up resistor of resistor array 430, all such resistors being connected with +5 v supply. The individual switches within switch array 428 provide for operator selection of a variety of operational aspects, for example, the rate of transmission of coordinate pair signals per second. In this regard, the coordinate pair signals may be transmitted at one pair per second, five pairs per second, 40 pairs per second and so on. The user also may set mode switches, electing for example, the mode "point" wherein coordinate pair information or signals are sent when the operator presses a selected button of switch array 142. Further, a "stream" mode may be elected wherein coordinate pair signals are continuously sent, notwithstanding the depression of a switch at array 142. A "switch stream" mode may be elected where the coordinate pair information is sent as a stream of coordinate signals when the button or switch within array 142 is depressed, such transmission being halted when the switch is released; and an "idle" mode may be elected wherein no coordinate pairs are transmitted. The switch 428 also may be set to elect English or metric calibration. Further, the switch in permits the operator to elect the positioning of a carriage return or carriage return-line feed character as a suffix to any transmission, while a BIN/BCD switch election provides for the submittal of data as binary or as converted to ASCII format.

A similar switch is shown in FIG. 11C at 432. Looking to that switch, the operator may select a baud rate by manipulation of the four switches so labelled. Next in sequence, the operator may elect to provide for parallel data at the following or leading edge of a strobe input by manipulation of the "data strobe" switch. Next in the sequence, the operator may elect to carry out a status valid check. In the next adjacent switch component, an even or odd parity may be selected by the operator, while the next switch in the sequence provides for operator election for parity or no parity. Finally, the switch 432 permits the election of a resolution of either a 3 mil or a 5 mil circle of confusion. The latter three switch inputs at switch 432 are directed to the respective 2A4, 2A3 and 2A1 input ports of a buffer 434. Similar to buffer 424, buffer 434 may be of a type 74HC244 and its output terminals are shown coupled to common data-/address bus 402. The 1A1-1A4 ports of buffer 434 also are coupled with input lines 436-439 extending from the corresponding four switches of the array thereof 142 of tracer 130 (FIG. 6). Note that all inputs to the buffer 434 are coupled through pull-up resistors within the array 440 each, in turn, extending to +5 v supply.

Bus 402 also is shown extending to the output ports of an input buffer 442 which may, for example, be present as a type 74LS244. The input ports to buffer 442 are coupled with as line array 444 each line of which is coupled to +5 v supply through a pull-up resistor of an array thereof shown at 446. Line array 444 serves to provide a parallel connection with a host computer or the like and functions to receive structuring or programming data, for example, corresponding with and overriding the data which the user might otherwise provide through manipulation of earlier-described switches 424 and 432. The parallel output ports of the circuit are shown as line array 448 which extend from connection with the 1Q-8Q output ports of an output latch 450. Present, for example, as a type 74LS273, the 1D-8D input ports of latch 450 are coupled to bus 402 and, as is apparent, the latch provides for 8-bit output data to the host computer with which the apparatus 28 performs. Immediately above latch 450 is another output latch 452 the 1D-8D input ports to which are coupled with bus 402 and the various outputs to which provide for control functions within the system. Provided, for example, as a type 74HC273, the 1Q terminal of latch 452 serves to convey an X CONTROL signal as described in conjunction with line 73 in FIG. 8B and which is represented by the same connector designation 196 as shown in that figure. The 2Q terminal of latch 452 carries the Y CONTROL signal as represented in FIG. 8B at connector 198 and line 74, the former also being reproduced in the instant figure. The 3Q terminal conveys the earlier-described PLUS CONTROL discussed in conjunction with connector 192 in FIG. 8A which connector identification again is reproduced in the instant figure, while the 4Q terminal carries the corresponding MINUS CONTROL as described in the same figure at connector 190, which connector designation is repeated herein. Finally, the 6Q–8Q terminals of latch 452 carry the gain control inputs to automatic gain control circuit 242 as represented in FIG. 9B at connector 248, which connector designation is repeated in the instant figure.

Returning to FIG. 11B, microprocessor 380 is shown to provide the start convert signal at connector 308 as described in conjunction with FIG. 9C through its serial data out terminal (SOD). In similar fashion, the microprocessor receives the conversion complete signal at its serial data input (SID) terminal from connector 336 emanating from converter 292 as shown in FIG. 9C. The same connector designations are represented in the instant figure. An interrupt to the microprocessor 380 is provided at its RST 6.5 terminal from the timing function of circuit 400 through line 454 and type 74LS86 gate 456. The opposite input to this exclusive OR gate is provided from +5 v supply. In similar fashion, an interrupt is directed to the microprocessor 380 RST 7.5 port from UART 404 to indicate the reception of a byte. In this regard, note that the receiver ready terminal RX is coupled through line 458 and type 748C32 OR gate 460 to the noted terminal. The opposite input to gate 460 is derived from line 462 which, in turn, is coupled to the output of another 74LS86 OR gate 464, the input to which is developed from the uppermost lead of parallel input port lead array 444. Note that the signal carried by the noted lead is ANDed with +5 v supply and is additionally directed to the 1A1 input of buffer 442. In similar fashion, the host reset signal input is shown in FIG. 11C as being directed through line 466 carrying +5 v supply and line 468 carrying inverter 470 to the TRAP terminal input of microprocessor 380.

Component control or system mapping developed from the microprocessor 380 is provided from terminals A13–A15 which are coupled through pull-up resistor array 472 to +5 v and are coupled to the CS1, 1A, 1B, 2A, 2B control input terminals of a decoder 474. Decoder 474 is provided as a type 74HC139, the 1Y0 terminal thereof 474 serves to provide a chip select input along line 476 to the CE terminal of PROM 412 (FIG. 11A). Similarly, the 1Y1 terminal of decoder 474 provides a chip select signal along line 478 to the chip select, CS, terminal of circuit 400. The 1Y2 terminal of decoder 474 is coupled via line 480 to the chip select, CS, terminal of UART 404.

The CS2 terminal of decoder 474 is coupled to the output of an OR gate 482, one input to which at line 484 stems from the output of an inverter 486, the input to which is provided from lines 488 and 490 which are connected to the A15 terminal of microprocessor 380. The opposite input to gate 482 is provided from line 492 which extends to the read, RD, terminal of microprocessor 380.

Terminal 1Y0 of the second grouping of terminals of decoder 474 is shown coupled by line 494 to the enabling input terminals of buffer 442 (FIG. 11C), while the next adjacent output terminal 1Y1 is coupled via line 496 to the corresponding enabling terminals of buffer 434. In similar fashion, the 1Y2 terminal of this second grouping is coupled to provide enablement via line 498 to the corresponding enabling input terminals of buffer 424 (FIG. 11A).

To provide additional decoding capability for the system, terminal 1Y3 of the upper terminal grouping of decoder 474 is coupled by line 500 to one input of OR gate 502. Gate 502 may, for example, be provided as a type 74HC32. The opposite input to gate 502 is derived from the write, WR, terminal of microprocessor 380 by coupling through lines 504 and 506. The output of gate 502 at line 508 is coupled to the clock, CLK, input of output latch 452 (FIG. 11C).

In similar fashion, line 506 is coupled to the input of another OR gate 510, the opposite input to which is provided from line 512 extending from line 484. The output of gate 510 at line 514 extends to the clock, CLK, input of output latch 450. The clear, CLR, terminal of latch 450 additionally is coupled by line 516 to the commonly coupled RST terminals of microprocessor 380, circuit 400 and UART 404 from line 518. The signal from line 518 is inverted at inverter 420 prior to assertion thereof at line 516.

Microprocessor 380 carries out initialization functions upon the application of power to the system or by operator actuation of a switch 520 shown in FIG. 11A. One side of switch 520 is coupled to ground, while the opposite side thereof is connected to line 522 which extends to the RIN terminal of microprocessor 380. Line 522 is held at +5 v supply through resistor 524 which performs within an R-C network in association with a capacitor 526. Accordingly, with the closure of switch 520, capacitor 526 is permitted to discharge to provide for the application of a pulse along line 522. A diode 528 serves to provide protection against voltage transients above +5 v. Power-up restart also is provided automatically in conjunction with the resistor 524-capacitor 526 network. As is apparent, the network provides a desired slight delay.

UART 404 is utilized for serial communication with a given host computer in conjunction with a serial interface port shown in FIG. 11B in general at 118. The input to UART 404 is from microprocessor 380 to the D0–D7 data input ports thereof from bus 402, while output of the device is provided at the transmit data, TXD port at line 530, which output is buffered at gate 532 for presentation at line 534. A corresponding serial input to UART 404 is provided at line 536 containing an inverter 538 and leading to the RXD terminal. Below these terminals are the conventional handshake functions. In this regard, the ready to send signal provided at the RTS terminal is provided at line 540 incorporating a buffer 542, while the clear to send signal is inputted at the CTS terminal from line 544 which is coupled to +12 v supply through resistor 546. Line 544 also incorporates an inverter 548. The data terminal ready output signal is provided at the DTR terminal of UART 404 and is conveyed via line 550 incorporating buffer 552.

As indicated earlier herein, the baud rate elected for operation of UART 404 is selected by the operator in conjunction with the actuation of components of switch array 432 (FIG. 11C). This election of baud rate is applied via four lead array 556 to the A-D inputs of a baud rate timer 558. The thus-elected frequency output from timer 558 is provided at line 560 which is directed to the TXC and RXC terminals of UART 404.

The parallel output port 120 (FIG. 11C) of the digitizer 28, for application with certain host components, requires a select timing input. This select timing input is provided as a data strobe signal at line 562 as shown in FIG. 11C. Line 562 extends from the output of an exclusive OR gate 564, one input to which is an enabling logic level from line 566 extending from an operator controlled data strobe election at switch 432. Note that line 566 is normally held at +5 v supply through resistor 568. The opposite input to gate 564 at line 570 carries the data strobe timing signal from a combined counter 572 and inputting JK flip-flop 574 as shown in FIG. 11B. The J terminal input of flip-flop 574 is coupled to receive the timing output normally applied to output latch 450 by virtue of its connection to line 514 through lines 575 and 576. The clock signal is inverted at line 576 by an inverter 578. A clock input for flip-flop 574 is derived from counter 386 and lines 390 and 392 (FIG. 11A) and carries the noted 204.8 KHz signal. This same signal is applied through inverter 580 and line 582 to the input to counter 572, while the output thereof at line 570 is fed back via line 584 to the K terminal input of flip-flop 574. The output therefor at line 584, representing a division by four provides for the resetting or initializing of flip-flop 574. The output at 570 additionally provides a predetermined delay of about 60 microseconds to represent the noted data strobe signal to the host equipment. Thus, the latch 450 is loaded with data, following which the signal at line 562 indicates that data is available for utilization.

Where the digitizer is receiving data from the host, a data ready signal may be provided from that host, for example, at line 586 of array 444 (FIG. 11C). Line 586 extends to the J terminal input of another flip-flop 588 shown in FIG. 11B. Flip-flop 588 is clocked from line 590 extending to connection with line 384 carrying the clock output of microprocessor 380. The K terminal of the flip-flop is coupled to ground, and the Q terminal output thereof is coupled via line 592 to the 2A3 terminal input of parallel input buffer 442. The clear terminal of flip-flop 588 is coupled to line 574 such that clearing occurs in conjunction with a write command. Flip-flop 588 serves the function of holding the data ready signal received from the host computer until such time as the microprocessor 380 is capable of polling or reading the signal.

Figures 12C, 12E:
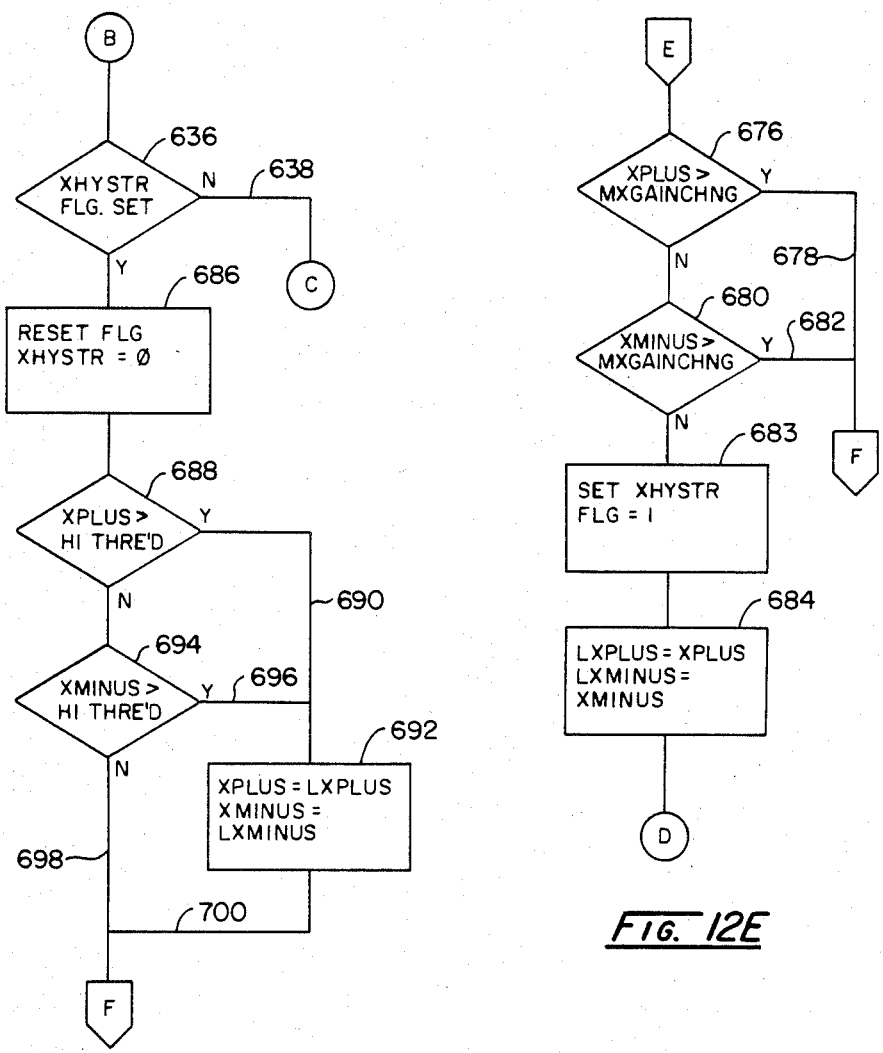

Referring to FIGS. 12A-12C, the overall control program provided for by microprocessor 380 is revealed in diagrammatic fashion. As indicated at the top of FIG. 12A, the program commences upon a start procedure. This procedure, as discussed earlier herein, can be commenced by power up. Additionally, restart can be carried out by the momentary actuation of switch 520 to effect the discharge of capacitor 526. Following start-up, as represented at block 600 of FIG. 12A, all interrupts within the system are disabled such that no interrupt procedure can be carried out during the initialization of the control system. Following this disabling task, the program progresses to initialize stack pointers and memory variables as represented at block 602. Following this task, as represented at block 604, the switches 428 (FIG. 11A) and 432 (FIG. 11C) are read to provide the operator selected parameters for performance of the system. It may be recalled from the discourse in conjunction with FIGS. 11A-11C that those host computer can override the switch selections. Based upon the selection of switches as represented at block 604, the system then sets the mode registers as represented at block 606. There are four possible modes of operation of the system which have been described above as being "point", "stream", "switch stream", and "idle". Following the setting of the mode register, as represented at block 608, the resolution flag is set for high or low resolution as elected by the switches and, as represented at block 610, the English or metric flag is set depending upon operator election at those switches. The program then progresses to the instruction of block 612 wherein a flag is set in accordance with the election of serial or parallel transmission at the noted switches. Finally, as represented at block 614, the ports of UART 404 are initialized.

Because the direct current amplification or similar components of the circuit of the digitizer 28 will exhibit drift characteristics in conjunction with any given operational environment, as described in conjunction with FIG. 9B, a positive offset is assured and that offset then is digitized or measured. This is carried out by essentially bringing line 250 to ground level by microprocessor command to selector network 242. This command is represented at block 616, the amount of offset being measured and retained. Following the measurement of offset, represented at block 618, the microprocessor sets the gain at network 244 and associated control 242 to a maximum value in anticipation for a worst case situation where such gain is required. The program then continues as represented by mode or connector A to the instruction shown in FIG. 12B. Looking to that figure, the connector A is shown leading to the instructions of block 620 whereupon the completion of initialization procedures is seen to be followed by an instruction to enable the interrupts for normal operation.

The system then commences to carry out measurements along the x coordinate directions and the system gain is set to the x gain setting as represented by the instruction at block 622. This instruction will set a maximum value for the first cycle of the program, however, as the program continues to cycle, the XGAIN selection will be adjusted. Upon setting the gain, is represented by the instruction block 624, the analog switches are set for an X+ configuration. In this regard, it may be recalled that in FIG. 4, the XCONTROL and PLUSCONTROL signals are actuated such that switches 56 and 67 are set or closed in addition to the switches of arrays 42 and 44. With the provision of this switch logic, as represented by the instruction in block 626, a subroutine ADREAD is called so that a digital valuation is developed corresponding with the XPLUS measurement taken. This ADREAD subroutine is described in detail in copending application for U.S. patent Ser. No. 665,302, by R. Kable entitled "Electrographic Apparatus" filed of even date herewith and assigned in common herewith. The program then progresses to the instructions at block 628 where the XPLUS measurements in digital format are stored. As represented at block 630, the system then converts to a minus control while maintaining an XCONTROL setting of the switches so that the opposite direction of the X coordinate may be evaluated. As described at block 632, the ADREAD subroutine is called and a digital valuation for XMINUS is developed and, as represented at block 634, this value is stored, all such storage being effected in RAM in conventional fashion.

As represented by node B, the program then progresses to the corresponding node identification in FIG. 12C and the inquiry represented at block 636 determining whether or not the X hysteresis flag has been set. This flag will have been set at such time as a possibility exists that two valid but different gain control evaluations are present for a given XPLUS and XMINUS coordinate evaluation. In the event that the flag is not set, then as represented by line 638 and node C, the program diverts to the instruction in FIG. 12D commencing with the connecting node C shown thereon.

In general, the program represented in FIG. 12D determines whether the two X coordinate readings made above are valid in terms of gain. In this regard, a window is established having high and low threshold values within which the digitalized measurements taken are compared. Generally, the criteria for this comparison are that both readings must be below the high threshold of the window and one of them must be above the low threshold. Looking to the inquiry at block 640, a determination is made as to whether the XPLUS value is greater than the high threshold, and in the event that it is, then as represented by line 642, an inquiry is made as represented at block 644 as to whether the XGAIN value is greaer than the minimum gain of the system. In the event that it is, then as represented by block 646, the XGAIN value is decreased by one increment as represented by one resister within the network 244 shown in FIG. 9B. It should be noted, that the resistance values for each of the discrete resistors within network 244 are selected for establishing about 18% increments of impedance. This percentage increment is considered the optimal for carrying out gain alteration without causing an oscillation between adjacent gain values which would otherwise occur with lower percentage incremental values of resistance. Following the adjustment of XGAIN, as represented at node or connector D, the program returns to set the system gain as at block 622 as represented by the corresponding node in FIG. 12B and line 648. In the event that inquiry at block 644 is in the negative, then, as represented by line 650, the program again returns to set the system gain as represented at block 622.

Where the inquiry at block 640 shows that the XPLUS value is higher than the high threshold, then as represented by block 652, a determination is made as to whether the XMINUS value is greater than the high threshold. In the event that it is, then as represented by line 654, the same procedure is carried out for selectively decreasing the XGAIN value. In the event that both the XPLUS and XMINUS values of measurement are below the high threshold value, then as represented at block 656, a determination is made as to whether the XPLUS value is above the low threshold level. In the event that this value is not above that threshold, then as represented by line 658 and block 660, a determination is whether the XMINUS measurement is above the low threshold. In the event that it is, then as represented by line 662 and block 664, the XGAIN value is stored. Similarly, where the inquiry at block 656 indicates that the XPLUG value is above low threshold, as represented by line 666, the XGAIN is stored. This value of XGAIN then is utilized as set forth in conjunction with block 622 in FIG. 12B at such time as the next operational cycle occurs. The program then proceeds to carry out a hysteresis check as represented by connector E.

In the event that neither the XMINUS nor XPLUS values exceed the low threshold, then as represented by line 668 and decision block 670, a determination is made as to whether the XGAIN is less than the maximum available gain of the system. In the event this test is met, as represented at block 672, the XGAIN value is incremented. Conversely, where the XGAIN value is not less than the maximum available gain, then as represented by line 674 and node or connector D, the program returns to the corresponding node at line 648 in FIG. 12B and will be seen to assert the same gain value at line 648. Conversely, where an increase in the XGAIN value has been carried out by the instructions at block 672, then that increased value is asserted at the position represented by line 648 and the gain of the system will reflect that value as represented at block 622.

As indicated earlier herein in conjunction with block 636 of FIG. 12C, where a singular point is evaluated along a given singular coordinate direction by applying the a.c. source first to one border and then the other, it has been found that non-linearities in the resistive surface 30 or in the system itself will cause improper readings for a given coordinate point inasmuch as two different gain levels may be developed for measurement of the same point. Accordingly, the routines represented in FIGS. 12C and 12E are applied. With the routines represented thereby, the highest available valid gain is elected for the system where two valid gains are present. Looking to FIG. 12E, the connector or node E extending from a stored XGAIN instruction at block 664 first is evaluated to determine that if the gain signal were to be increased one gain step or, for example an 18% factor, would the resultant increase remain within the window of threshold acceptance. Accordingly, at block 676 the XPLUS signal is evaluated on the basis that if it were to be increased with respect to an increase in gain of, for example, 1/18th percent or one step, would that value remain within the high threshold value of the window of evaluation. Block 676 carries that evaluation out and in the event that the XPLUS value could be incremented by one gain factor, then as represented at line 678 and connector F, the program may continue. Where the XPLUS signal cannot be so altered, then as represented by block 680, the same evaluation is made of the XMINUS signal. Where the XMINUS signal can be incremented by one gain factor, then as represented by line 682, the program continues without gain alteration.

On the other hand, where both the XPLUS and XMINUS signals fail the evaluations of block 676 and 680, then a condition exists wherein the measurements are not greater than the maximum window threshold. Accordingly, as represented at block 683, the X hysteresis flag is set as discussed in conjunction with block 636 and FIG. 12C. At this point, a prediction is present that a dual gain situation is in effect for a given coordinate point. However, to accommodate for a situation where this prediction is incorrect, the last XPLUS and last XMINUS values initially measured are stored as represented by the instruction of block 684.

Returning to FIG. 12B, it may be observed that node D extends to line 648 and the program continues to node B. As before, this node leads to the corresponding node in FIG. 12C. Referring to FIG. 12C, it may be observed that the inquiry at block 636 is now in the affirmative representing a prediction that there exists a higher gain in the system which will give a valid reading with respect to the high and low threshold defined gain window. Accordingly, the program then proceeds to the instructions in block 686 where the X hysteresis flag is reset to 0 and, as represented at decision block 688, an initial determination is made as to whether the gain change is valid. Accordingly, if the incremented XPLUS value is greater than the high threshold, as represented at line 690 and block 692, the last XPLUS value is reinstated in the program, the prediction having failed. Similarly, where the XPLUS value is not below the high threshold, then as represented at block 694, the same evaluation is made of the incremented XMINUS value. Where the XMINUS value exceeds the high threshold, then as represented by line 696, the last values are utilized as represented at block 692. In the event of a negative determination at block 694, or in the event that last values are utilized, then as represented by lines 798 and 700, the program continues as represented at node or connector F which again is represented at FIG. 12F. Referring to the latter figure, it may be observed that the XPLUS measurement initially is treated by the instruction of block 702 where that value is placed in temporary register to avoid its loss. The program then progresses to average the present XPLUS reading with the last XPLUS reading effect form of software filtering wherein any transients or rough changes in the system are smoothed out. This instruction is represented at block 704. Then the last XPLUS reading is placed in temporary register to become the present reading as represented by the instruction at block 706. This same procedure then is repeated with respect to the XMINUS measurement, the XMINUS value being placed in temporary register to avoid its loss as represented at block 708, whereupon the XMINUS value is averaged with the last reading as represented at block 710 and the last reading then is placed in temporary register for instant use as represented at block 712.

With this final treatment of the X coordinate measurements, the program then shifts to carry out a corresponding set of coordinate measurements along the Y coordinate direction. Referring to FIG. 12G, it may be observed that node G provides for continuation of the program in conjunction with the instructions of block 714 wherein the YGAIN is recalled from memory and the system gain is set to the value of YGAIN. Next, as represented at block 716 the analog switches are set for a configuration wherein the a.c. source 50 is applied to the plus border of the Y coordinates. In this regard, and referring additionally to FIG. 4, switches 56 and 67 will be closed, while the YCONTROL will be applied to switch arrays 46 and 48. Following the setting of the switches, as represented at block 718, the subroutine ADREAD is called to convert the received signals to digital format. Following this conversion, as represented at block 720, the YPLUS digitized results are stored and the switch system then is set to apply the a.c. source to the negative designated Y coordinate border as represented at block 722. In this regard, the MINUS CONTROL signal is applied to close switches 57 and 64 as shown in FIG. 4. Following the collection of readings, as represented at block 724, the ADREAD subroutine is called to digitize the resultant values and, as represented at block 726, the results are stored as the YMINUS reading. The program then continues as represented at node H which reappears at FIG. 12H. Looking to FIG. 12H, the node H is shown to lead to the decision posed at block 728 wherein a determination is made as to whether the Y hysteresis flag has been set. In the event it has not been set, then as represented at line 730, the program continues as represented at node I which reappears at FIG. 12I. Looking to FIG. 12I, the program initially looks to the high threshold and inquires as to whether the measured YPLUS value is greater than threshold as represented at block 731. The program proceeds as represented by line 732 to the inquiry posed at block 734. At block 734, a determination as to whether the YGAIN is greater than the minimum gain is made and in the event that it is, as represented at block 736, the YGAIN is decreased by one increment or a factor of, for example, 18%. As represented at line 738, the program then proceeds as represented at node J which is shown in FIG. 12G to extend via line 740 to the input to the instructions at block 714 where system gain is set to YGAIN. In the event that the determination at block 734 shows that YGAIN does not exceed the minimum gain, then as represented at line 742, the program again reverts to node J and line 740 as shown in FIG. 12G.

Figure 12H:
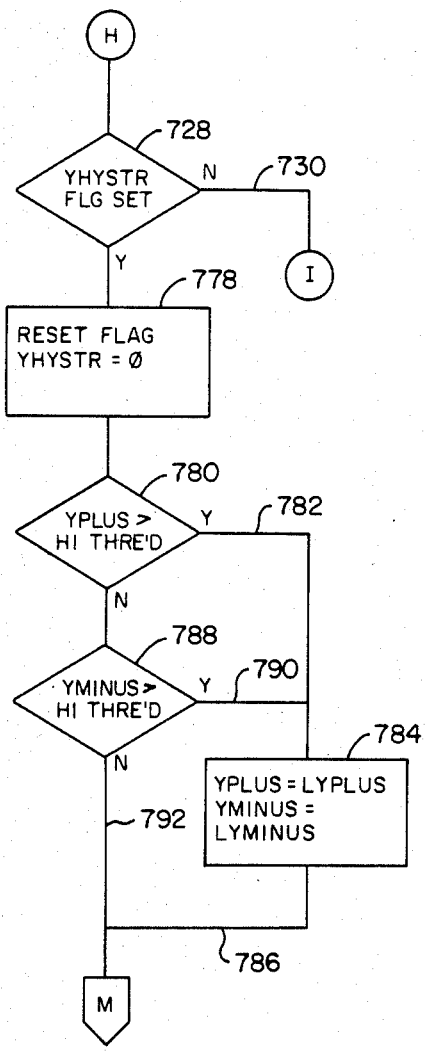
Figure 12J:
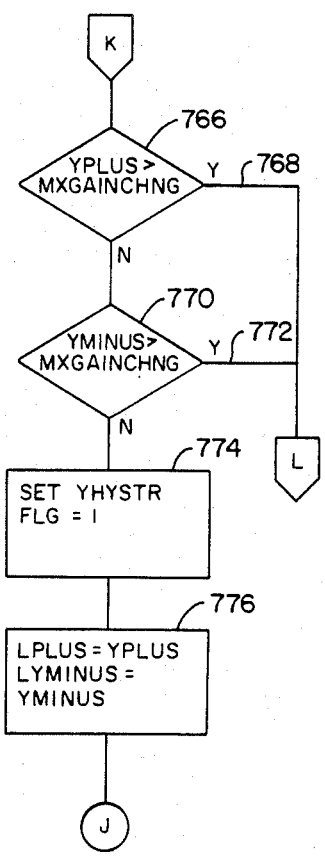

Returning to FIG. 12I, in the event the inquiry at block 731 shows that the YPLUS reading is not greater than the high threshold of the gain entrance window, then as represented at block 744, the corresponding inquiry is made as to whether the YMINUS measurement is above the high threshold of the gain window. In the event that it is, then as represented at line 746, the YGAIN is decreased and the program continues as discussed in conjunction with node J. Where the inquiry at block 744 shows that both measurements are below high threshold, then as represented at block 748, determination is made as to whether the YPLUS measurement is greater than the low threshold of the gain window. In the event that this is not the case, then as represented by line 740 and block 752, the corresponding measurement is made with respect to the YMINUS value. Where the result of the inquiry at block 748 is in the affirmative or the result is affirmative from block 752, then as represented by respective lines 754 and 756, the resultant valid gain is stored as represented at block 758. The program then proceeds as represented at connector K.

Where the inquiry at block 752 determines that YMINUS is not above the low threshold, then as represented at block 760, a determination is made as to whether YGAIN is less than the maximum gain factor available. If this is the case then as represented at block 762 the YGAIN is increased by one factor, for example 18%. In the event the inquiry at block 760 results in a negative response, then as represented by line 764, the program returns via node J and line 740 to a setting of the system YGAIN as shown in FIG. 12G. This same procedure is carried out upon the increasing of the YGAIN as represented at block 762.

Where the YGAIN has been stored as represented at block 758, the program progresses as shown at connector K which is reproduced in FIG. 12J. Referring to the latter figure, the YPLUS value as incremented by one factor of gain is compared with the maximum available gain change as described in conjunction with block 676 for the X coordinate. Where the inquiry results in an affirmative response, no incrementation would be available and, as represented at line 768, the program proceeds to connector L. Where the inquiry at block 766 results in a negative answer, then as represented at block 770, the same inquiry is made of the YMINUS value and, in the presence of an affirmative response, as shown at line 772, the same progression of the program as represented by connector L occurs. Where the inquiry at block 770 results in a negative answer, then as represented at block 774, the Y hysteresis flag is set to one following which, as represented by block 776, a storage function occurs wherein the last value of YPLUS is made YPLUS and the corresponding last value YMINUS is made YMINUS. The program then returns as shown at node J to line 740 as shown in FIG. 12G. As the program repeats, it again encounters the inquiry at block 728 as shown in FIG. 12H. In this case, the inquiry will indicate that the Y hysteresis flag is set and the program will continue to the instruction at block 778 where the hysteresis flag is reset to 0. Upon resetting the hysteresis flag, as shown at block 780, a determination is made as to whether enhanced YPLUS is greater than the high threshold level of the gain window as represented at block 780. In the event that it is, then as represented at line 782 and block 784, the YPLUS value and the YMINUS value are returned to the last values thereof. The program then progreses as shown at line 786 to continue as represented at connector M. Where the determination at block 780 shows that the YPLUS value is below the high threshold level, then as shown at block 788, a corresponding determination is made as to whether the enhanced YMINUS value is greater than the high threshold level of the gain window. In the event that the value of the threshold is exceeded, then as represented at line 790, the last values for YPLUS and YMINUS are recalled and the program continues. The program similarly continues where the YMINUS value is below the high threshold level as represented at line 792.

As in the case of the X coordinate, the program then carries out a form of software filtering with respect to Y coordinate measurements to smooth out any transients or rough changes in the system. Looking to FIG. 12K and connector M, the program is seen to store the YPLUS value in temporary register as represented at block 794. Upon effecting such storage, as represented at block 796, the YPLUS value is averaged with the last YPLUS reading. Then, as represented at block 798, the last YPLUS value is stored in temporary register and, as represented at block 800, the YMINUS value is placed in temporary register. The next instruction at block 802 provides for the averaging of the YMINUS values, the current YMINUS value being averaged with the last YMINUS value. Then, as represented at block 804, the last YMINUS value is utilized, being stored in temporary register. The program then is at a stage where a full set of measurements of deriving the X and Y coordinates are developed and the program then looks to deriving coordinate information or position from these values. Referring to FIG. 12L, node N again is reproduced and is shown leading to blocks 806 and 808 which serve to prepare the system for making a next reading. In this regard, the instruction at block 806 provides for setting the system gain to XGAIN and block 808 provides for setting the analog switches to carry out an XPLUS configuration reading.

The program then progresses to the instruction at block 810 wherein a normalized X value, XNORM, is derived using the difference/sum procedure. The value is considered normalized due to its derivation from the natural coordinates of the resistive sheet 30. In this regard, the values at this juncture range from a minus value to a positive value. It then is desired to convert the normalized value, XNORM, to a value in a coordinate system running in terms of positive integers, ie. from a 0 value to some other positive value. Because the resistive sheet 30 will have variations in its structure, the actually read value from one border to another will not follow a precise progression. Consequently, the minimum or 0 value of the sheet 30 is pre-read and stored in ROM memory for corrective use. This value is designated XMIN. Similarly, the corresponding measurement is taken with respect to the Y coordinate direction, the value YMIN being developed and placed in memory.

As shown at block 812, the program then subtracts the value XMIN from the value for XNORM and multiplies it by an expansion factor designated X$EXPAND. The latter term simply is an expansion factor to provide a large number suited for digital treatment, for example 64,000.

The program then checks the resultant value for X to assure that no unacceptable number is present. Such a bogus value, for example, might occur where the tracer has been located outside of the active area of the sheet 30. Accordingly, as represented at block 814, a determination is made as to whether the X value is greater than the known maximum X value, XMAX. In the event that it is, then as represented by line 816 and connector O, the program starts again, returning to the corresponding connector designation in FIG. 12B wherein a command to carry out an analog-to-digital conversion reading is made as represented at block 626. Note that node O in the latter figure extends to the program via line 818.

In the event that X value is acceptable with respect to a maximum valuation, then the program looks to the comparison made at block 820 wherein the X value is compared with a minimum or 0 evaluation. In the event that the X value is below such 0 evaluation, then as represented by line 822 and 816, the program returns to line 818 as above discussed. Where the X value is correct with respect to 0, then as represented by line 824, the corresponding operations are carried out with respect to Y valuations. In this regard, as shown at block 826, the normalized Y value, YNORM, is derived as a difference/sum ratio, whereupon, as shown at block 828, a corrected and expanded value for Y is developed and, this value is tested in accordance with the instruction at block 830 to determine whether it is beyond the YMAX value. In the event that is the case, as represented at line 832 and connector O, the program returns to line 818 in FIG. 12B. Where the Y value is correct with respect to YMAX, then as represented at block 834, the value of Y is tested with respect to 0. Where it is less than 0, then as represented by lines 836 and 832, the program returns to line 818 as above discussed. Where the Y value is proper with respect to tracer location and the like, then as represented by block 838 an error correction procedure is carried out which is digital in nature and is provided, for the most part, to correct for variations in the thickness of coating of the resistive sheet 30. A subroutine for carrying out this error correction is described later herein. Following error correction, the program calls for an output subroutine described in the above-identified U.S. application for patent Ser. No. 665,302, and shown at block 840. This completes the general program, the program returning to line 818 and connector O as described in conjunction with FIG. 12B.

The error correction system of the invention which utilizes the subroutine described generally at block 838 in FIG. 12L, is concerned principally with the necessarily encountered variations in resistivity of the resistive surface or layer 30. Because of variations in the manufacture of such devices, the excitation signal either applied from oppositely disposed boundary inputs or through the locator or tracer will generate voltages or representative signals which will be found to vary from a desired linearity as they are evaluated from one border to the other in parallel with coordinate axes. For the system to derive accurate digital output signals corresponding with positions upon the surface 30, some form of correction for this non-linearity is required. However, the requirement for correction must be met with a system and method which remains cost effective and which is capable of carrying out correction without undue delay which, for example, may be occasioned by the computer operations involved in carrying out mathematical procedures. In particular, where such procedures involve multiplication or division, the element of time becomes significant and the corresponding element of cost becomes unacceptably elevated for developing products having a desirably broad market base.

Looking at FIG. 7, a pictorial representation of resistive surface 30 is shown having overlaid thereon a grid-like array of predetermined physically locatable preestablished positions or points represented by the intersections of $\epsilon$ coordinate lines 850–854 and $\eta$ coordinate lines 856–861. These $\epsilon,\eta$ coordinate grid lines representing a physical domain may be considered to be regularly spaced and mutually perpendicular as well as aligned with the borders of the resistive surface 30. In the event that the borders are excited as described in conjunction with FIG. 4 and the locator 32 is positioned at each of the grid intersections, then a linear signal output will be derived when moving from one border to the other in the ideal sense described in conjunction with FIG. 3 and curve 24. In practice, however, for any given resistive surface 30, the positioning of the locator 32 at such a grid intersection or position will not derive a linear output which would be presented, for example, to a host computer, but will develop a distorted representation of the grid array as represented by the correspondingly primed and dashed line distorted representation of the grid array. For illustrative purposes, the latter grid array is shown with coordinate values x,y (considered to be in a signal domain) imposed with the noted $\epsilon,\eta$ grid values.

To illustrate a requirement for correction, consider that the locator 32 is positioned at the point 864 shown in FIG. 7 which may be observed to fall within the grid array intersections of grid lines 853, 854 and 856, 857. The signal output from the locator 32 at point 864 ($\bar{\epsilon},\bar{\eta}$) will not bear a linear relationship with the standard linear outputs represented by the rectangular grid array but will have some signal values, $\bar{x},\bar{y}$. Since the ultimately desired or standardized coordinate values for point 864 in the linear grid array is ($\bar{\epsilon},\bar{\eta}$) then one approach to correction represents the mathematical mapping or transformation:

$$\bar{\epsilon}=f(x,y)$$

$$\bar{\eta}=g(x,y)$$

or dropping out the overbars for simplicity $$\epsilon=f(x,y) \qquad (1)$$

$$\eta=g(x,y) \qquad (2)$$

Because the above transformation formulas are evaluated each time the signal values (x,y) are received, their mathematical expressions must be very simple while maintaining a high accuracy. Another important aspect is that the transformations are unique to each tablet since non-uniformity of the resistive film of each tablet is different.

The correction system of the invention first involves the development of the regular grid-like array (physical domain) as represented by coordinate lines 850–854 and 856–861 in FIG. 7. The number of grid lines in the array or the size of the resultant "squares" defined by the grid lines is selected so as to evolve discrete rectangular regions of size large enough to ultimately develop memory addresses from the noted x,y values, while fine enough to achieve a desired accuracy of interpolation. Accordingly, following the determination of this grid array of physically locatable positions, electrical signals (date set) of a signal domain are measured for the system which represent values for each one of the grid array intersections. To develop the signal data, the locator or like device 32, in an off-line procedure, is positioned at each one of the regular grid array intersections in the physical domain and readings (x,y) are taken in normal manner. The set of electrical signals (x,y) for all the grid array intersections cannot be immediately used to derive the transformations f and g that can be efficiently used in an on-line microprocessor. Notice that the values of $\epsilon$ and $\eta$ of the physical domain in this measured data set change with a constant physical increment, but the corresponding electrical signals x and y change non-linearly. This is the reason why deriving a computationally efficient functional form of f and g using the measured x and y immediately is difficult.

In the instant process, the relation between the physical domain ($\epsilon,\eta$) values for the grid array intersections and the corresponding signal domain electrical signals (x,y) is reprocessed as follows: First, another signal domain grid array on the x-y coordinates is considered, in which the grid lines are rectangular and equally spaced. The size of the signal domain x-y grid is wide enough to contain all the coordinates x,y electrically measured corresponding to the physical domain grid array on the tablet and fine enough to provide good accuracy for the transformation.

Second, the physical domain coordinate values $\epsilon$ and $\eta$ corresponding to the signal domain grid array intersections on the x-y coordinates are mathematically found by solving the set of equations:

$$x=F(\epsilon,\eta) \qquad (3)$$

$$y=G(\epsilon,\eta) \qquad (4)$$

where x and y are coordinates of the signal domain grid array intersections.

In the above equations, F and G are interpolative transformations ($\epsilon,\eta$) to (x,y) based on the electrical signals x and y measured for each of the grid array intersections on the $\epsilon$-$\eta$ grid array intersections on the tablet.

The set of pairs ($\epsilon,\eta$), thus computed for each of the grid arrays on the x-y coordinates is designated as "correction table". It is important to recognize that, in the correction table, the x and y values change with a constant increment, but ε and η values change non-linearly. With the correction table thus obtained the transformation (1) and (2) can be mathematically easily and efficiently expressed in an interpolative form. A more detailed discourse concerning the development of the "correction table" is set forth herein in conjunction with FIG. 15 et seq.

The method thus described is implemented in two separate steps:

Step 1(a): measurement of electrical signals x and y for each of grid array intersections on the tablet.

Step 1(b): an off-line computation of the correction table, wherein equation (3) and equation (4) are solved to find and corresponding to the x and y values on the grid array intersections on the x-y coordinates.

Step 2: This step involves an on-line microprocessor incorporated into the tablet system. The on-line microprocessor contains the correction table and equation 1 and equation 2 in the interpolative form.

All of the correction table data are placed in read only memory as part of the manufacture of the system 28. In actual use, then, the second portion of the computation need only address this tabulation retained in memory to derive the data required to carry out a correction by simplified interpolation which is desirably swift and can be accomplished with relatively simpler microprocessor devices.

Figure 13:
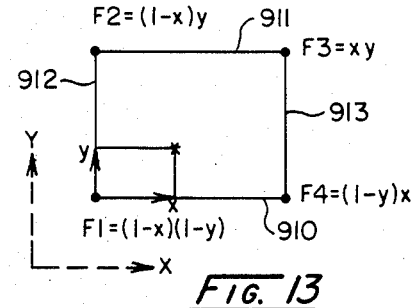
FIG. 13 is an enlarged representation of a signal domain.

Now considering the second portion or on-line computation of the system, the ERROR CORRECT subroutine is illustrated in connection with the flow chart of FIGS. 14A and 14B. In particular, the subroutine commences with the formation of an error pointer or index for accessing the read only memory having the above-described look-up correction table. It may be recalled that the x and y digital position signals developed by the system are 16 bits in length. To identify an appropriate grid region, the five most significant bits of these x and y digital position signals are utilized. Looking to FIG. 14A, it may be observed that the instructions at initial block 870 are to mask the lower order N bits of the x signal. In this regard, the lower 11 bits of that 16 bit signal are masked. Following the instruction at block 870, as represented at block 872, the corresponding low order N bits of the y signal are similarly masked. Thus, the five high order bits for x values and y values are then derived. As represented at block 874, these two high order bit sets then are concatenated to derive a 10 bit correction memory address which is utilized to access the correction look-up table in ROM 412. Looking additionally to FIG. 13, this access locates the grid position or point intersection which is in the lower left-hand of the signal domain grid rectangle or discrete "region" within which the given point, for example 864 falls. The access to the memory also will find the remaining grid points of the subject rectangle. Weighted Averaging then is carried out wherein a weighting factor is applied to each of the noted four grid line computed physical domain coordinate values and the four values as thus treated are summed to derive corrected coordinate output signals for x and y coordinates. As shown in FIG. 13, for the noted interpolation technique, the weighting applied to the computed physical domain coordinate value at the intersection of grid lines 910 and 912 is designated F1, the weighting of which is derived as the product: $(1-x)(1-y)$, where x,y values are obtained as the electric signal from the locator on-line. Expanding this expression as represented in block 876 in FIG. 14A, it may be observed that only one step of multiplication is present, i.e. xy, the remainder of the weighting factor being the product of subtraction and addition. FIG. 13 shows that for the remaining grid intersections, taken in a clockwise sense, weighting factor F2 will be $(1-x)y$, factor F3 will be xy and weighting factor F4 will be $(1-y)x$. It may be observed that these factors are derived as represented in the instructions of blocks 876, 878, 880 and 882. Preferably, factor F3 (block 880) is initially derived inasmuch as the term xy is employed in deriving factor F1, which, in turn, is used to derive factor F2.

The program then continues as represented at line 884 to the instructions at block 886 wherein YFLAG is set to 0 indicating that corrected x coordinate output signals are being developed and further providing for the setting of a correction value which is accumulated or provides a running average in the register of the products of the four correction weighting factors multiplied by their corresponding computed physical domain coordinate values The subroutine then progresses to the instruction represented at block 888 which converts the designation of the index or address into the error correction table to become an error pointer. Following this arrangement, the four values of the earlier-described surrounding grid intersections are accessed from memory with the error pointer in the noted clockwise direction. However, the first weighting factor multiplication may be carried out with respect to the initial intersection at the lower left hand of the discrete region rectangle or, as shown in FIG. 13, at the intersection of grid lines 910 and 912. The correct coordinate values and then are multiplied by the weighting factor F1 to derive a first correction factor as represented at block 890. Then, as represented at block 892, the index pointer is incremented so as to, for example, as represented in FIG. 13, find the computed physical domain coordinate value for the intersection of grid lines 911 and 912. Upon accessing this value, as represented at block 894, that value is multiplied by weighting factor F2 and the resultant value is added to the correction running average, i.e. at the CORR register. The program then increments again as represented at block 896 to access the computed physical domain coordinate values for, for example, the intersection of lines 911 and 913 as shown in FIG. 13. Then, as represented by the instructions at block 898, the weighting factor F3 is multiplied by that accessed value and the resultant product is added to the value then in the corrections, CORR, register. The program then continues as represented by connector, Q to the instruction represented at block 900 and shown in FIG. 14B. Block 900 indicates that the index pointer is incremented to its final position which, for example, is represented at FIG. 13, as the intersection of grid lines 853 and 857. The resultant standard coordinate value is accessed from memory and, as represented at block 902, this value is multiplied by the weighted factor F4 and the result is added to the CORR register to provide a final value or the running summation of the weighted ε coordinate values. The program then proceeds to the inquiry as represented at block 904 to determine whether YFLAG has been set to a logic 1 value. In the event that it has not, then, as represented at block 906, the summed value in the CORR register is established as the ε position coordinate. The program then proceeds to the instructions represented in block 908 wherein the error pointer is made equal to the error pointer and the η offset such that η values may then be accessed from the memory. Following, this, as represented at block 910, YFLAG is set to a logic 1 value and the subroutine progresses as represented by connector R and line 912 in FIG. 14A to carry out the weighting factor routines as above discussed. Where the inquiry at decision block 904 indicates that YFLAG is equal to a logic 1, then as represented at line 914 and block 916, the noted weighting factor routine will have been completed with respect to the η coordinate and the summed CORR register values are made equal to the η position coordinate for outputting. The subroutine then returns to the main program as represented at FIG. 12L to carry out the CALL OUTPUT subroutine represented at block 840.

Figure 15:
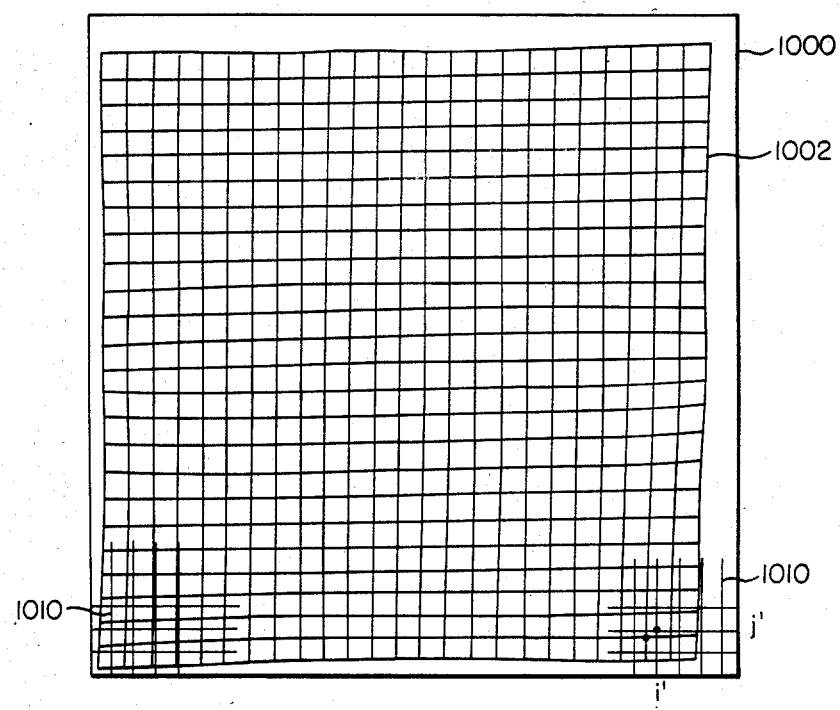
FIG. 15 is an illustration of a computer plotted grid generated by positioning a cursor in regularly spaced increments along coordinate axes of a resistive surface digitizer table.

Now considering the above-discussed development of the "correction table" wherein signal domain values x,y are derived in conjunction with corresponding physical domain coordinate values, $\epsilon,\eta$, the reader's attention initially is turned to the representation of a host computer plotted grid represented in FIG. 15. This grid may be developed by incrementally positioning a tracer or the equivalent in regularly spaced fashion along the coordinates of electrographic resistive surface 30 and plotting the data (data set) which would be received, for example, from along line 116 (FIG. 4) as it is introduced to the control function 70. For developing the correction table, the correction sub-routines as described in conjunction with block 838 in FIG. 12L are by-passed to generate this initial data set for a given electrographic device. In FIG. 15, the physical domain boundary of the active area of the resistive surface is represented within the rectangle 1000. As described in conjunction with FIG. 7, where the tracer is positioned in regularly spaced fashion along the grid points defined by lines 850-854 and 855-861 and no correction is provided, the somewhat distorted output plot represented at 1002 will be developed. The error correction method and system of the invention utilizes this data set as graphically represented at 1002 to develop the noted correction table. Thus, the data set readings are measured or taken off-line and stored in a file for development of the correction table containing the above-noted coefficients utilized in the process of on line rapid error correction.

Figure 16A:
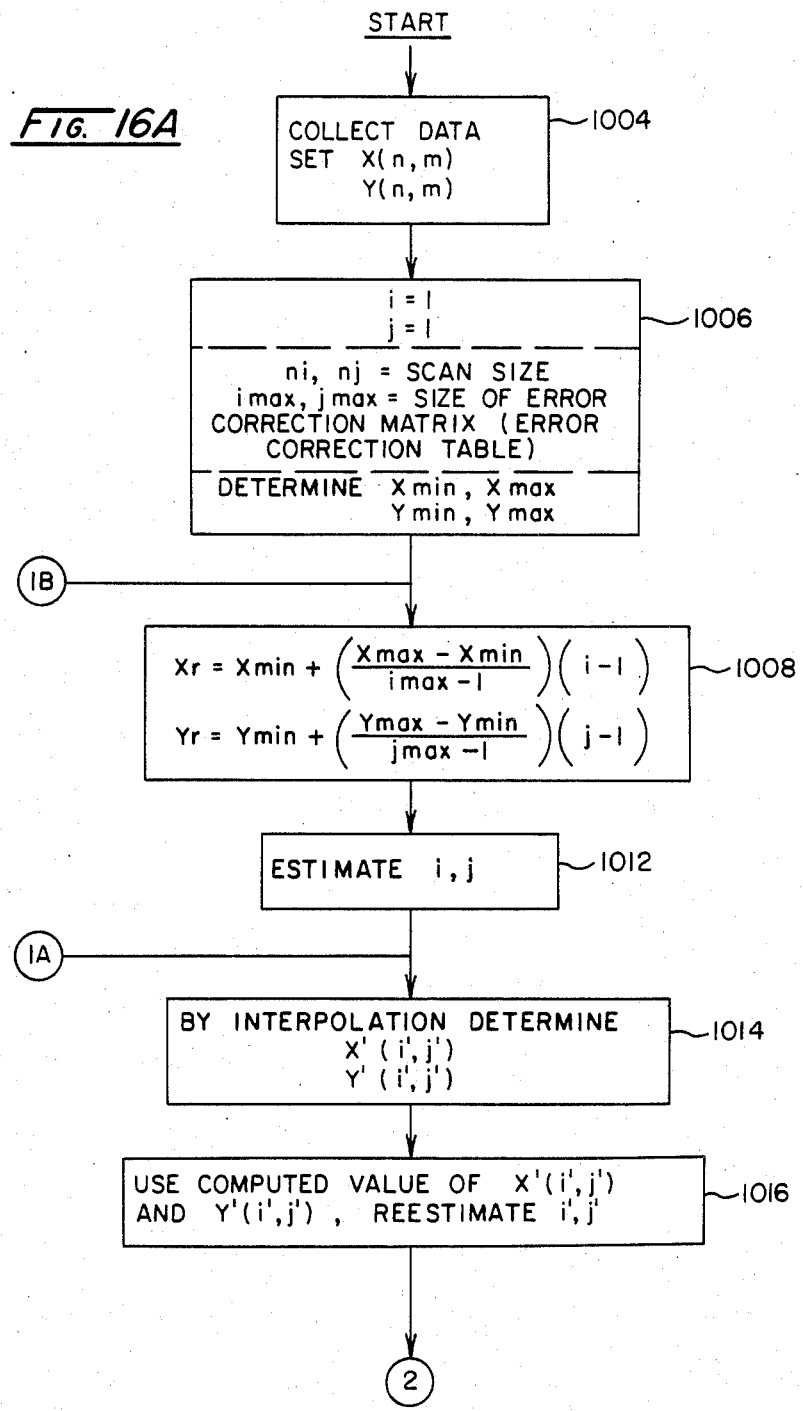

Looking additionally to FIGS. 16A and 16B, which combine to provide a high level or more generalized procedure at the start of correction table preparation, as represented at block 1004 the above-noted data set is collected. For this collection procedure, the pick-up or tracer, for instance, may be moved from position to position across the resistive sheet 30. The grid point spacing for such collection may, for example, be in one-half inch increments in both the x and y directions. A resultant collection of signal domain data representing coordinate aligned regular grid locations in the physical domain of the surface 30 is represented in block 1004 as x(n,m) and y(n,m) where the value, n, progresses from 1 to $n_{max}$ and the values of m progress from 1 to $m_{max}$. The maximum values will depend upon the incremental spacing elected and for the noted ½" grid spacing applied to a 12"×12" active area 30, such maximum values will be 25. It may be observed in FIG. 15 that the plot 1002 is a 25×25 grid matrix positioned within the border 1000 of the active area.

Upon completion of collection of the data set, the instant procedure then progresses to the activities represented at block 106. These activities include the establishment of a normalized indexing arrangement wherein a group of incremental values along the x coordinate axis are set to unity as represented at i=1 and similarly, a unity indexing value is established along the y axis as represented by the instruction, j=1. Additionally, the bounds of the signal domain values of the data set are determined and are represented by the values $x_{min}$, $x_{max}$; $y_{min}$, $y_{max}$. Upon this determination of the bounds of the input data set, the number of grid locations or points which are to be utilized in developing the error correction table are determined. In this regard, a finer form of correction can be achieved by enlarging the number of grid positions utilized for correction and this will determine the size of the error correction matrix or table. Accordingly, the maximum values for the indices, i,j, are determined and represented respectively at $i_{max}$, $j_{max}$. For the exemplary grid arrangement show in FIG. 15, 32 segments are elected both for the i coordinate and j coordinate. Finally, the activities at block 1006 provide for initialization of the numbers, ni, nj, representing the number of grid points which have been analyzed at any given point in time. For the example of FIG. 15, the maximum value achieved will be 25.

The program then derives two sets of regularly incremented address locatable values arranged for a 32×32 signal domain grid or matrix so as to provide a sequence of regularly incremented or spaced signal domain values which are designated $x_r$, $y_r$, the progressive valuations of which are developed in accordance with the relationships shown in block 1008. Thus, for the instant example shown, are 32 regularly incremented values for $x_r$ and $y_r$. A physical representation of such an indexing arrangement for the physical domain is shown partially in FIG. 15 at 1010. The signal domain distribution also may be represented by this grid 1010.

Upon the development of the regularly incremented signal domain values $x_r$, $y_r$, the program then seeks to find the now irregularly spaced physical domain locations for each of the signal domain regularly incremented values $x_r$, $y_r$. Upon developing such data, the information required for the on line memory contains correction table is completed.

The initial approach to developing the location of these physical domain irregular positions, now designated i', j', is one of estimation based upon two methods, one being predicted upon a confidence seated in the history of production of the resistive surfaces and the other looking more to a searching form of investigtion based upon broader initial data. Thus, an initial estimate is made for the physical domain locations i', j' as represented at block 112. Following this intial estimation, the system refines the estimated i', j' value utilizing a Newton interpolation. With this approach, there is derived from the first estimated physical domain location, i', j', and adjacent values of the input data set, an interpolated physical domain coordinate location which is evolved as the signal domain values, x', y'. These signal domain values are functions of the originally estimated physical domain locations i', j' and, accordingly, may be represented as: x'(i', j'); y'(i', j') as represented at block 1014.

Following the development of the signal domain values x',y', as represented at block 1016, a re-estimation of the physical domain coordinate location i', j' is carried out based upon the signal domain values x', y'. This new or refined physical domain value, i', j', is then tested for convergence as represented at decision block 1018. This test determines the difference between the refined new value of i', j', and the next preceding such value. Where the test determines that the difference or differential between these two tested values is greater than a predetermined error value, then as represented by line 1020 and node 1A, which leads to the input of block 1014, the program again carries out a Newton interpolation based upon the refined value for i', j'. As represented at line 1022 and block 1024, in the presence of an acceptable convergence of values the program then determines whether the incremented values for j have reached the earlier determined maximum value $j_{max}$, representing a completion of analysis along the y coordinate direction. In the event of an affirmative determination at block 1024, then as represented at line 1026 and block 1028, the same determination is made with respect to the indexing of the physical domain value, i. Where the maximum value, $i_{max}$ is achieved, then as represented at line 1030 and block 1032, the error correction routines are completed and all information will have been stored in memory to serve as an on-line correction table.

In the event the inquiry at block 1024 shows that indexing is not complete with respect to the j or y coordinate orientation, then as represented by block 1034, the previous value for j is incremented by 1. The program then proceeds as represented at line 1036 to block 1038 where the value y is set equal to the determined j' value and filed in the error correction memory table. Similarly, where the inquiry at block 1028 shows that the indexing value for i has not reached a maximum, then as represented at block 1040, the last value for i is incremented by 1 and, as represented at lines 1036 and block 1038, the value of $x_a$ within the error correction table for the signal domain address at hand is set equal to the determined i' value. Upon setting either value $x_a$ or $y_a$, and submittal thereof to memory, then as represented at node 1B, the program returns to determine next $x_r$ or $y_r$ values in conjunction with the instructions at block 1008.

Looking to FIG. 17, a first of the noted two methods for estimating the physical domain irregular positions i', j' is set forth in an enhanced level of detail. Labeled generally at 1012 in correspondence with the identically numbered block in FIG. 16A, this estimation routine is shown entered at line 1042 whereupon an inquiry is made as to whether the index, j, is equal to 1. In this relationship, the index, in effect, represents the physical domain grid 1010 as described in conjunction with FIG. 15. In the event of an affirmative response, then as represented at block 1046, the value i' is estimated by a relatively simple formula, the value, x, shown therein representing signal domain values derived in the initial data set and located at the noted positions (ni,1) and (1,1). Where the inquiry at block 1044 results in a negative determination, then as represented at line 1048 and block 1050, the value, i', is determinend from a last value submitted to the correction table, i.e. the value $x_a$ at the location (i,j−1).

Following the above determination of the value, i', the program determines whether the index, i, is equal to 1 as represented at inquiry block 1052. In the event that an affirmative determination is made at block 1052, then as represented at block 1054, a valuation for the physical domain position j' is determined utilizing the formula shown. In that formula, the values for y(1,nj) and y(1,1) represent the signal domain valuations of the originally derived data set at the noted grid locations. Where the indication at block 1052 is that the value i does not equal 1, then as represented at line 1056 and block 1058, the last sequential look-up table valuation for j' is withdrawn from the location represented as (i−1,j). Upon completing the noted estimation procedure, as represented at line 1060, the same program continues to the operations described in conjunction with block 1014 in FIG. 16A. Generally, the estimation method represented in FIG. 17 is one developed wherein production histories show that such an approach will be of acceptable value. For example, the distortions represented in FIG. 15 at the grid assemblage 1002 show a lack of severity to the extent that predictions can be made according to the instant more simple approach. In effect, the approach looks to the establishment of initial values at the beginning of a given column or row of the grid as developed in conjunction with the information in blocks 1046 and 1054. Thereafter, the estimation can be drawn from the last position value in the developing memory retained correction table. A more elaborate approach for use in conjunction with higher levels of distortion or in conjunction with products not having a known history of performance is described in conjunction with FIG. 20 later herein.

Figure 15A:
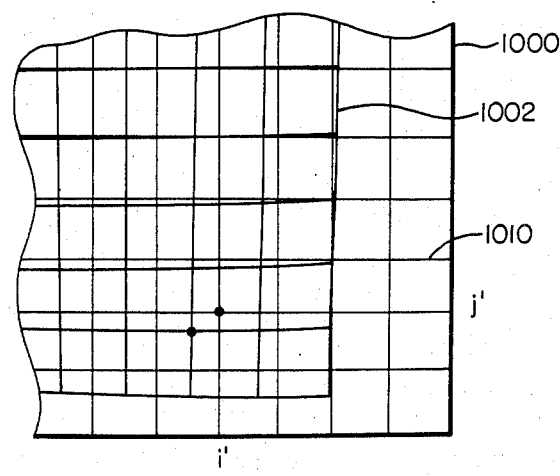
FIG. 15A is an enlarged view of one corner of the plot of FIG. 15.

Turning to FIG. 18, the Newton interpolation approach as described generally at block 1014 in FIG. 16A is illustrated at an enhanced level of detail. The later numeration is reproduced in the figure to represent the interpolation in general. With this routine, the program seeks to find the real value of the coordinates i', j' having initially estimated their location. For example, looking again to FIG. 15 and the enlarged fragmentary view thereof in FIG. 15A, the program seeks to find the physical domain real location of the point having the coordinates i', j' which may be observed to be positioned in conjunction with a regularly spaced signal domain grid as earlier developed. A physical point may be picked out from the original data set having, x, y signal domain values which represents a distortion but having a known physical location on the resistive surface 30. With the interpolation, it is this latter known physical location and the signal value therefrom which is operated upon to find a realistic evaluation in the physical domain for the coordinate i', j'. Note that the desired point or position on the table, i', j', represents one corner of the regularly spaced grid and that the elected data set component of information lies within the square represented thereby. Looking to the physical domain indices, i,j, and providing a normalized unity incrementation from one regular grid spacing of the grid 1010 to the other, commencing with the lower right position on the developed square, the coordinates surrounding the data set point elected will generally be: i,j; i+1,j; i+1,j+1; and i,j+1. The interpolation utilizes these data to evolve the desired real value i', j'.

Returning to FIG. 18, the program for interpolation is seen to commence with line 1062 leading to the activities represented in block 1064. These activities involve the development of coefficients as well as values. In the latter regard, $\Delta i$ represents the difference between the i' point being sought and the value, i as shown, i.e. (i'−i). A similar relationship is developed for the j coordinate. Following the development of these relationships, a sequence of computations providing weighting factor coefficients identified as emm, epm, emp, epp are developed in accordance with the relationships shown in block 1064.

The program then proceeds to the activity described in conjunction with block 1066, wherein the value x' is evolved. This signal domain value is correlated with the earlier-described $x_r$ and represents the data set signal domain values for x appropriately weighted with respect to the estimated physical location of the desired point. Additionally, as shown in block 1066, the partial derivatives of x with respect to i are carried out as well as the partial derivative of x with respect to j in accordance with the Newtonian approach to interpolation. Following these computations, the same activity is carried out in the development of the signal domain value y' as shown in block 1068.

Upon development of the noted partial derivatives and the values x', y', the determinant (det) representing a form of summation of the partial derivatives is generated in accordance with the formula shown in the noted block. Additionally, the value $\Delta x$ is computed as the difference between the signal domain regular value $x_r$ and the computed signal domain function x'. The corresponding value for $\Delta y$ is developed as represented by the formula in block 1070. These latter delta evaluations then are utilized in re-estimating the valuation i', j' as described in conjunction with block 1016 in FIG. 16A.

Referring to FIG. 19, the noted re-estimation portion of the program is shown at an enhanced level of detail having been labeled with the general designation 1016. The re-estimation activity commences as represented at line 1074 with the computation of the values $\Delta i$ and $\Delta j$ in accordance with the formulations shown using the earlier-developed partial derivatives, the values $\Delta x$ and $\Delta y$ as well as the value of the earlier computed determinate (det). With the resultant values of i and j, the re-estimated values of i', j' are summed as shown in the subject block.

The program then tests for convergence as discussed earlier in conjunction with block 1018 and shown in FIG. 19 by the decision block 1078. As represented therein, the values of i and j are used for testing for convergence, those values being compared with a predetermined error value. Where the test shows there is no convergence, then as represented at line 1080 and node 1A, the program returns as shown in FIG. 16A to carry out a reinterpolation based upon the last value for i' or j'. Where a convergence occurs, then as represented at line 1082, the program continues as shown in FIG. 16B.

Figure 20A:
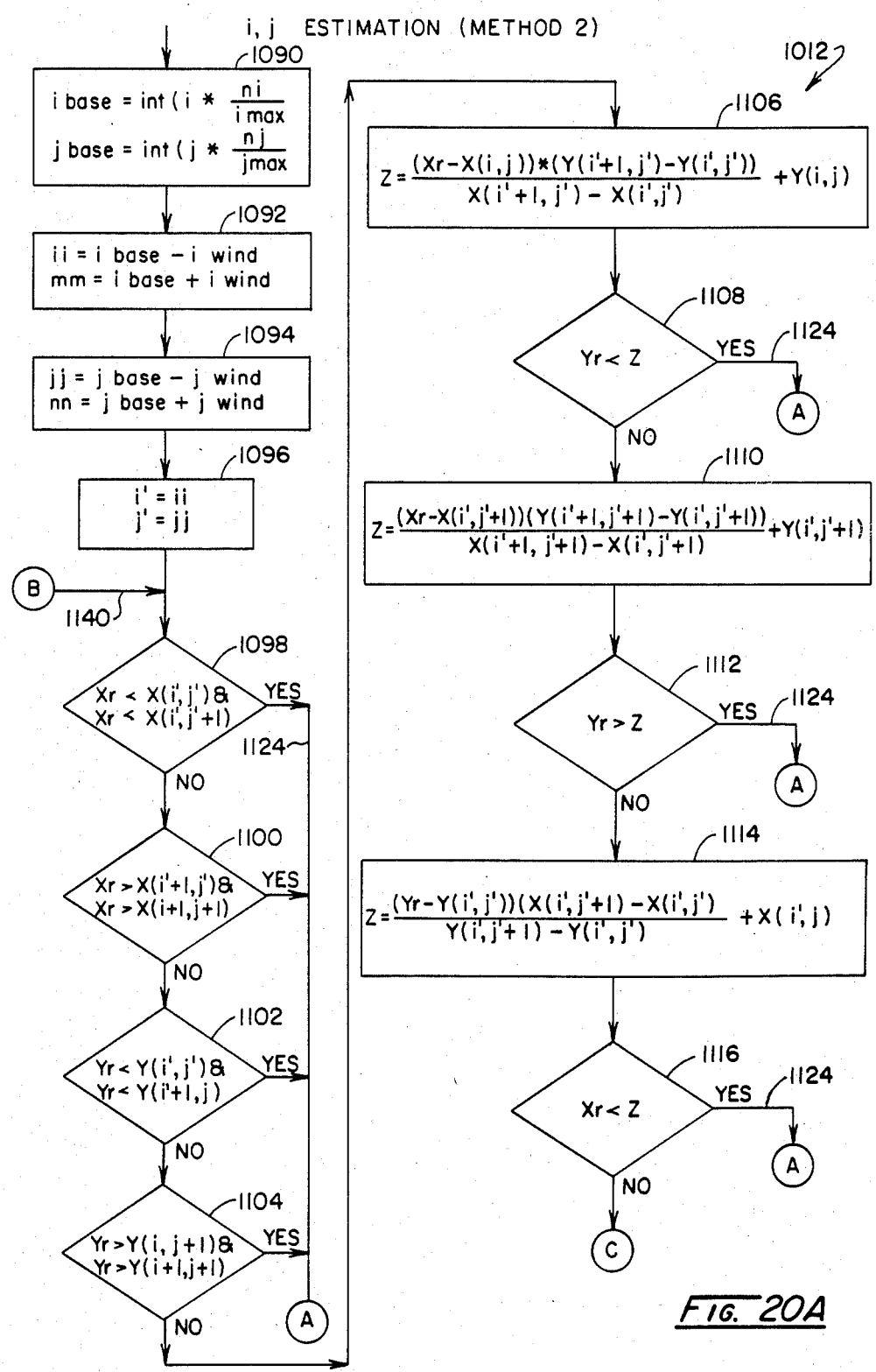

Looking to FIGS. 20A and 20B, a flow chart representation of the more elaborate or second estimation method as discussed above in connection with block 1012 in FIG. 16A is set forth. This method may be employed in situations where only more rough initial information is available, i.e. there is either a lack of history in developing the estimations or distortions may be at a greater level than would be suited for the initially disclosed technique.

The instant estimation approach is one realizing that the data sets are not overly distorted such that a reasonable estimation as to the location of the point can be carried out. For example, a point will fall at a location which can be considered as a ratio of the distance between opposite boundaries and the actual physical location of the measured data set point. The instant approach is one looking to such ratios initially and establishing windows of generally rectangular shape which may have sizes based upon the physical domain data set grid defined rectangles. For example, the lengthwise extent of two such grid defining rectangles may be employed in defining a window size. Thus, the initial localization of a desired estimated point commences with the election of a window in the physical domain established by the data set.

Looking to FIG. 20A, the first estimation of the location of the point in the x coordinate direction is labeled "ibase" and is shown to be equal to the integer function representing a ratio of the number of points taken, ni, to the maximum number of grid positions, "imax" as multiplied by the value, i of the physical domain. A similar estimation is provided for the y coordinate direction as is labeled, "jbase". The method at hand also considers that the ratios defining the approximate location of the point in the physical domain will generally hold true in the signal domain.

The program then commences to locate the window within which the desired physical domain point may be located and this is carried out by computing the indexes ii and mm for x coordinate positions. In this regard, a value, "iwind", is employed which is a physical domain length elected for a given window value. Note that the activities of block 1092 show that the window is defined in an x coordinate direction both one window value to the right and the the left of the elected base point. The program then looks to the activities of block 1094 wherein the indices jj and nn are developed in similar fashion as those developed at block 1092, however, along a y coordinate orientation stemming from the initial jbase value. In effect, the program now searches within that window region to evolve an accurate estimation of the desired physical domain point. The initial procedure in commencing this search is represented at block 1096 wherein the first estimated value for the physical domain desired point, i' is set equal to ii and the corresponding desired physical domain point, j', is set equal to jj. The program then carries out a series of tests and evaluations of this initial assumption. In effect, the search of the discrete elected range is within a region which ranges in the x direction from ii to mm and in the y direction from jj to nn. The initial election at block 1096 sets the estimated points at the lower bounds, ii, jj, of this region of search.

The initial tests carried out commenced with that revealed in conjunction with decision block 1098. Block 1098, the earlier calculated signal domain value xr is tested against the initial signal domain value (data set) at location i', j' and at location i', j'+1. Where the value xr is above those values, then the program proceeds to a next test as represtend at decision block 100. The activities in this block determine whether the signal domain value xr is above the corresponding data set signal domain value at the location i'+1,j', as well as at i'+1,j'+1. Where that is not the case, then as represented by decision block 1102 an initial evaluation of the signal domain value, $y_r$ is carried out with respect to the signal domain data set values y(i',j') and y(i'+1,j'). In the event this test is not met, then the program progresses to the test at decision block 1104 wherein the signal domain value, $y_r$, is compared against the data set signal domain value y(i,j+1) and y(i+1,j+1). In the event the criteria of this test are not met, then the program progresses to carry out a form of proportional error test which, in effect, looks to the symmetry of the desired point with respect to the bounds of the established window. Where the desired point is not generally symmetrically surrounded by the window boundaries, then searching procedures will not be suitably accurate. Thus, a first test of this nature is carried out in accordance with the relationship revealed in block 1106 wherein a value Z is determined. Once that first value of Z is determined, the value $y_r$ is tested against it as represented at block 1108. Where the value $y_r$ falls above the initially computed Z value, then, as represented at block 1110, a next Z value is computed and, as represented at block 1112, that next value of Z is compared against the value $y_r$. Where the value $y_r$ falls below the next computed value of Z, then as represented at block 1114, still another value for Z is computed and, as shown at block 1116, the signal domain value $x_r$ is compared against that next computed value of Z. Where the value $x_r$ falls above the last computed value of Z, then as shown at node C and as represented at block 1118 in FIG. 20B, a final value of Z is computed and as shown at block 1120, the value $x_r$ again is compared against the last computed value of Z. Where the value $x_r$ does not fall above this last computed value of Z, the testing is concluded and as represented at line 1122, the program commences to carry out a Newton interpolation as described earlier in conjunction with block 1014 of FIG. 16A.

Should any of the above enumerated tests as at blocks 1098, 1100, 1102, 1104, 1108, 1112, 1116, or 1120 result in an affirmative determination representing a test failure, then the program immediately defaults, as represented by lines 1124 and connectors A, to the evaluation represented at decision block 1126 (FIG. 20A). At this block, a query is made as to whether the elected value, j', is equal to the window coordinate nn. In the event that it is, as represented at line 1128 and block 1130, a next determination is made as to whether the corresponding coordinate i' is equal to the window position mm, i.e. does the point fall at a corner of the window. In the event the determination at the instructions of block 1130 is in the affirmative, then, as represented at line 1132 and node D, those values are elected as the estimated position and the program progresses to the Newtonian interpolation function at block 1014 of FIG. 16A as represented by lines 1134 and 1122.

Where the determination as represented at block 1126 is that j' does not equal nn, then as represented by block 1136, the original estimate j' is incremented by a unit value and, as represented by line 1138 and connector B, the program commences to test that new value as represented at line 1140. Correspondingly, where the value j' has been found to be equal to nn, and the value i' has not been found to be equal to mm, then as represented at block 1142, the value i' is indexed to a next value i'+1 and, as represented at line 1144 and connector B, tests are then carried out with respect to this new evaluation.

Since certain changes may be made in the above-described system, and method without departing from the scope of the invention herein, it is intended that all matter contained in the description thereof or shown in the accompanying drawings shall be interpreted as illustrative and not in a limiting sense.

We claim:

1. An electrographic system comprising:
    means defining a graphics surface;
    locator means movable in adjacency about said surface for select interaction therewith to effect the derivation of position signals;
    circuit means responsive to said position signals for deriving digital position signals;
    memory means for retaining computed physical domain coordinate values derived as values corresponding with select said digital position signals of a signal domain and established for each position within a predetermined grid array of pre-established positions of said physical domain, adjusted to establish a regularly incremented sequence of address values within said signal domain; and
    control means responsive to each given said digital position signal received thereby for deriving a said address value corresponding therewith, for accessing said memory means at said address value to retrieve computed physical domain coordinate values corresponding therewith and for adjusting the values of said computed physical domain coordinate value by select-dimensional interpolative weighting thereof in correspondence with said received digital position signal to derive corrected coordinate pair output signals.

2. The electrographic system of claim 1 in which each said memory means address value corresponds with a rectangle of said signal domain bounded at the corners thereof by four said computed physical domain coordinate values.

3. The electrographic system of claim 1 in which said memory means address values comprise select high order bits of said digital position signals generated by said locator means interactions.

4. The electrographic system of claim 1 in which:
    said memory means address values comprise select high order bits of said digital position signals generated by said locator means interactions; and
    said control means select-dimensional interpolative weighting is carried out with select lower order bits of said given digital position signals generated by said locator means interactions.

5. The electrographic system of claim 1 in which:
    each said memory means address value corresponds with a rectangle of said signal domain bounded at the corners thereof by four said computed physical domain coordinate values;
    said control means is responsive to said given digital signal for deriving four discrete weighting factors corresponding with said four computed physical domain values, for applying a select said weighting factor to each to derive a weighted coordinate pair value and for summing said weighted coordinate pair values to derive said corrected coordinate pair output signals.

6. The electrographic system of claim 4 in which:
    said memory means address values comprise select high order bits of said digital position signals generated by said locator means interactions; and
    said control means select-dimensional interpolative weighting is carried out with select lower order bits of said given digital position signals generated by said locator means interactions.

7. The electrographic system of claim 6 in which said control means derives an initial said weighting factor in accordance with the expression, $(1-x)(1-y)$ where x and y are said select low order bits.

8. In an electrographic system wherein a surface is selectively accessed to develop electrical signals which are treated to provide outputs corresponding with the accessed position, the method of correcting the value of given said outputs, comprising:
    providing a memory for retaining computed physical domain coordinate values derived as values corresponding with select said outputs of a signal domain and established for each position within a predetermined grid array of pre-established positions of said physical domain, adjusted to establish a regularly incremented sequence of address values within said signal domain;

deriving a said address value from a said given output;

accessing said memory at said address value to provide a computed physical domain coordinate value corresponding therewith;

adjusting the value of said accessed computed physical domain coordinate value by a two dimensional interpolative weighting thereof in correspondence with said given output to derive a corrected said given output; and outputting said corrected given output to provide coordinate information representing said accessed position at said surface.

9. The method of claim 8 in which said address value is derived from select high order bits of a digital signal generated as said given output.

10. The method of claim 9 in which said adjustment of the value of said accessed computed physical domain coordinate value by interpolative weighting is carried out with weighting factors derived from said given output and applied to said accessed computed physical domain coordinate value.

11. The method of claim 10 in which:

each said memory address value corresponds with a rectangle of said signal domain, the corners of which are defined by four successive said computed physical domain values; and said interpolative weighting is carried out by four discrete weighting factors, each applied to a select said computed physical domain value corresponding with one said corner.

12. In an electrographic system wherein a surface of known geometric configuration is selectively accessed to develop electrical signals which are treated to provide outputs corresponding with the accessed physical position, the method of correcting the value of given said outputs with respect to variations of said surface comprising the steps of:

determining, within a physical domain, a grid array of physically locatable positions over said surface;

deriving, within a signal domain, said electrical signals and corresponding outputs with respect to each said array position of said physical domain;

deriving, within said signal domain, a regularly incremented sequence of address values;

determining physical domain coordinate values corresponding with each of said address values;

recording said physical domain coordinate values in conjunction with corresponding said address values;

deriving a correction said address value from a said given output;

accessing said memory at said correction address value for said physical domain coordinate values corresponding therewith;

adjusting the value of said physical domain coordinate values by select dimensional interpolative weighting thereof in correspondence with said given output to derive a corrected said given output; and outputting said corrected given output to provide coordinate pair information representing said locator physical position.

13. The method of claim 12 in which said adjustment of the value of said physical domain coordinate values is carried out by a two-dimensional interpolative weighting.

14. The method of claim 12 wherein:

said grid array is a rectangular array of grid lines the sections of which define said positions; and said memory address corresponds with a discrete region of said signal domain incorporating a select number of adjacent said physical domain coordinate values.

15. The method of claim 14 in which said correction memory address value for said discrete region is provided as select high order bits of a corresponding said given output.

16. The method of claim 12 in which:

each said given output is derived as a given digital signal; and said correction address value is derived as select high order bits of said given digital signal.

17. The electrographic system of claim 1 in which said control means is configured to effect a two-dimensional said interpolative weighting in correspondence with said received digital position signal to derive said corrected coordinate pair output signals.

18. The method of claim 8 in which said step of adjusting the value of said access computed physical domain coordinate value is caried out by a two-dimensional interpolative weighting thereof in correspondence with a given output.

19. The method of claim 12 in which said step of adjusting the value of said physical domain coordinate values is carried out by two-dimensional interpolative weighting thereof in correspondence with said given output.

20. In a system wherein a resistive surface is positionally accessed to evolve position outputs in a signal domain with respect to a predetermined array of grid locations within the physical domain of said surface, the method for correcting said position outputs comprising the steps of:

providing a memory for retaining computed physical domain coordinate values derived as values corresponding with select said outputs of said signal domain and established for each position within a predetermined grid array of pre-established positions of said physical domain, adjusted to establish a regularly incremented sequence of address values within said signal domain;

deriving a said address value from said given output;

accessing said memory at said address value to provide a computed physical domain coordinate value corresponding therewith;

adjusting the value of said accessed computed physical domain coordinate value by a selectively dimensional interpolative weighting thereof in correspondence with said given output to derive a corrected said given output; and outputting said corrected given output to provide coordinate information representing the location of said positional access of said surface.

21. The method for generating a memory retained look-up table for use in interpolatively correcting the position outputs in a signal domain corresponding to accessed locations within the physical domain of a resistive surface, comprising the steps of:

collecting an input data set from said surface representing physical and signal domain characteristics of said surface;

determining the bounds of said input data set as maximum and minimum signal domain values for first and second coordinate directions;

deriving first and second sets of regularly incremented address locatable values extending between said maximum and minimum signal domain values corresponding, respectively, with said first and second coordinate directions;

providing a first estimate of the physical domain coordinate location values on said surface corresponding with said address locatable values for each said first and second coordinate directions;

deriving from said first estimate and adjacent values of said input data set interpolated said physical domain coordinate location values for each said first and second coordinate directions; and positioning said interpolated physical domain coordinate location values in said memory in combination with corresponding said signal domain address locatable values.

22. The method of claim 21 including the step of testing said interpolated physical domain coordinate location values with respect to a predetermined error level variation from the immediately subsequently derived said interpolated physical domain coordinate location value prior to said memory positioning thereof.

23. The method of claim 21 wherein said input data set corresponds with a set of predetermined coordinate aligned grid locations in said physical domain.

24. The method of claim 23 wherein said step of collecting said input data set is carried out by accessing said resistive surface with readout means at a predetermined number of coordinate aligned regularly spaced grid point locations to derive column and row voltage level readouts at each said grid point location, and converting said voltage level readouts to corresponding digital values constituting said input data set.

25. The method of claim 21 wherein said step of deriving said first and second sets of regularly incremented address locatable values is carried out employing a predetermined numer of increments which is greater in number than said predetermined number of said input data set grid point locations.

26. The method of claim 21 wherein said interpolated physical domain coordinate location values are derived employing a Newtonian interpolation technique.

27. The method of claim 21 in which:
said step deriving said interpolated physical domain coordinate location values includes the steps of interpolatively determining adjustment values, and summing said adjustment values with said first estimates of said physical domain coordinate location values to derive second estimates thereof.

28. The method of claim 26 including the step of testing said interpolated physical domain coordinate location values by comparison of said adjustment values with predetermined tolerance criteria.

29. The method of claim 21 in which said first estimate of said physical domain coordinate location values is provided as the next preceding interpolated value thereof.

30. In an electrographic system wherein a surface of known geometric configuration is selectively accessed to develop electrical signals which are treated to provide outputs corresponding with the accessed physical position, the method of correcting the value of given said outputs with respect to variations of said surface comprising the steps of:

collecting an input data set from said surface representing physical and signal domain characteristics of said surface;

determining the bounds of said input data set as maximum and minimum signal domain values for first and second coordinate directions;

deriving first and second sets of regularly incremented address locatable values extending between said maximum and minimum signal domain values corresponding, respectively, with said first and second coordinate directions;

providing a first estimate of the physical domain coordinate location values on said surface corresponding with said address locatable values for each said first and second coordinate directions;

deriving from said first estimate and adjacent values of said input data set interpolated said physical domain coordinate location values for each said first and second coordinate directions;

positioning said interpolated physical domain coordinate location values in memory in combination with corresponding said signal domain address locatable values;

deriving a correction address locatable value from a said given output;

accessing said memory at said correction address locatable value for said physical domain coordinate location values corresponing therewith;

adjusting the value of said physical domain coordinate location values by select dimensional interpolative weighting thereof in correspondence with said given output to derive a corrected said given output; and outputting said corrected given output to provide coordinate pair information representing said locator physical position.

* * * * *